United States Patent
Chen et al.

(10) Patent No.: US 12,313,928 B2
(45) Date of Patent: May 27, 2025

(54) DISPLAY PANEL AND DISPLAY DEVICE

(71) Applicants: BEIJING BOE DISPLAY TECHNOLOGY CO., LTD., Beijing (CN); BOE Technology Group Co., Ltd., Beijing (CN)

(72) Inventors: Yuqiong Chen, Beijing (CN); Xiaona Liu, Beijing (CN); Mengjie Wang, Beijing (CN); Rui Zhang, Beijing (CN); Yujia Sun, Beijing (CN)

(73) Assignees: BEIJING BOE DISPLAY TECHNOLOGY CO., LTD., Beijing (CN); BOE Technology Group Co., Ltd., Beijing (CN)

( * ) Notice: Subject to any disclaimer, the term of this patent is extended or adjusted under 35 U.S.C. 154(b) by 531 days.

(21) Appl. No.: 17/763,657

(22) PCT Filed: May 13, 2021

(86) PCT No.: PCT/CN2021/093671
§ 371 (c)(1),
(2) Date: Mar. 25, 2022

(87) PCT Pub. No.: WO2021/254052
PCT Pub. Date: Dec. 23, 2021

(65) Prior Publication Data
US 2022/0334430 A1  Oct. 20, 2022

(30) Foreign Application Priority Data
Jun. 18, 2020 (CN) .......................... 202010559623.8

(51) Int. Cl.
*G02F 1/1335*   (2006.01)
*G02F 1/1343*   (2006.01)
(Continued)

(52) U.S. Cl.
CPC .. *G02F 1/133512* (2013.01); *G02F 1/134345* (2021.01); *G02F 1/136286* (2013.01);
(Continued)

(58) Field of Classification Search
CPC ......... G02F 1/133512; G02F 1/134345; G02F 1/136286; G02F 1/1368; G02F 1/133345;
(Continued)

(56) References Cited

U.S. PATENT DOCUMENTS

2008/0055500 A1   3/2008   Maeda
2013/0044285 A1   2/2013   Huang et al.
(Continued)

FOREIGN PATENT DOCUMENTS

CN   2002-341329 A   11/2002
CN   101846859 A    9/2010
(Continued)

OTHER PUBLICATIONS

International Search Report for PCT/CN2021/093671 Mailed Aug. 6, 2021.
(Continued)

*Primary Examiner* — Michael H Caley
*Assistant Examiner* — William D Peterson
(74) *Attorney, Agent, or Firm* — Ling Wu; Stephen Yang; Ling and Yang Intellectual Property

(57) ABSTRACT

A display panel and a display device are provided. The display panel comprises a first substrate and a second substrate provided opposite to each other. The first substrate comprises M*N subpixels defined by gate lines and data lines. Thin film transistors in the k-th display row are connected to a first data line, and thin film transistors in the (k+1)-th display row are connected to a second data line. The second substrate comprises M*N filter units, a black matrix is provided between adjacent filter units, and the black
(Continued)

matrix comprises shielding rows and shielding columns. The shielding row located between the k-th display row and the (k+1)-th display row has a first width, the shielding row located between the (k+1)-th display row and the (k+2)-th display row has a second width, and the first width is not equal to the second width. The display device comprises a display panel.

18 Claims, 12 Drawing Sheets

(51) Int. Cl.
    *G02F 1/1362*     (2006.01)
    *G02F 1/1368*     (2006.01)
    G02F 1/1333     (2006.01)

(52) U.S. Cl.
    CPC ...... *G02F 1/1368* (2013.01); *G02F 1/133345* (2013.01); *G02F 1/133514* (2013.01); *G02F 1/13439* (2013.01); *G02F 2201/52* (2013.01)

(58) Field of Classification Search
    CPC ........... G02F 1/133514; G02F 1/13439; G02F 2201/52
    USPC .......................................................... 257/72
    See application file for complete search history.

(56) References Cited

U.S. PATENT DOCUMENTS

| | | |
|---|---|---|
| 2014/0002333 A1 | 1/2014 | Tsai et al. |
| 2015/0362809 A1 | 12/2015 | Wang et al. |
| 2016/0148950 A1 | 5/2016 | Xu |
| 2017/0011693 A1 | 1/2017 | Park et al. |
| 2017/0077142 A1 | 3/2017 | Wu et al. |
| 2017/0169779 A1 | 6/2017 | Song et al. |
| 2017/0278868 A1 | 9/2017 | Tian et al. |
| 2017/0363894 A1 | 12/2017 | Uchida et al. |
| 2018/0081245 A1 | 3/2018 | Xiao et al. |
| 2018/0210277 A1* | 7/2018 | Wang ................. G02F 1/133305 |
| 2018/0343366 A1 | 11/2018 | Liao et al. |
| 2019/0129258 A1 | 5/2019 | Liu et al. |
| 2019/0196238 A1 | 6/2019 | Heo et al. |
| 2020/0117045 A1* | 4/2020 | Chen .................... G09G 3/3607 |

FOREIGN PATENT DOCUMENTS

| | | | |
|---|---|---|---|
| CN | 202948237 U | | 5/2013 |
| CN | 103792749 A | * | 5/2014 |
| CN | 104076565 A | | 10/2014 |
| CN | 104460147 A | | 3/2015 |
| CN | 104865737 A | | 8/2015 |
| CN | 105045013 A | | 11/2015 |
| CN | 105185791 A | | 12/2015 |
| CN | 105446029 A | | 3/2016 |
| CN | 105551390 A | | 5/2016 |
| CN | 106483727 A | | 3/2017 |
| CN | 107817926 A | | 3/2018 |
| CN | 108132560 A | | 6/2018 |
| CN | 108333843 A | | 7/2018 |
| CN | 108398836 A | | 8/2018 |
| CN | 109471309 A | | 3/2019 |
| CN | 109920356 A | | 6/2019 |
| CN | 109979317 A | | 7/2019 |
| CN | 110187578 A | | 8/2019 |
| CN | 111243441 A | | 6/2020 |
| JP | 2017-37211 A | | 2/2017 |
| KR | 10-2006-0035167 A | | 4/2006 |
| KR | 20070110586 A | | 11/2007 |
| KR | 10-2008-0073573 A | | 8/2008 |
| KR | 10-2013-0035230 A | | 4/2013 |
| TW | 201400931 A | | 1/2014 |

OTHER PUBLICATIONS

Office Action dated Apr. 12, 2022 for Chinese Patent Application No. 202010559623.8 and English Translation.
European Search Report for 21826654.2 Mailed Nov. 23, 2022.
Office Action dated Nov. 19, 2024 for KR10-2022-7014494 and English Translation.

* cited by examiner

DISPLAY PANEL AND DISPLAY DEVICE

CROSS-REFERENCE TO RELATED APPLICATIONS

The present application is a U.S. National Phase Entry of International Application PCT/CN2021/093671 having an international filing date of May 13, 2021, which claims priority of Chinese Patent Application No. 202010559623.8, filed to the CNIPA on Jun. 18, 2020 and entitled "Display Panel and Display Device", the contents of which should be interpreted as being incorporated herein by reference.

TECHNICAL FIELD

The present disclosure relates to, but is not limited to, the field of display technology, and in particular to a display panel and a display device.

BACKGROUND

Liquid Crystal Display (LCD) has advantages such as small size, low power consumption and no radiation, and has developed rapidly in recent years. A main structure of the LCD includes a Thin Film Transistor (TFT) array substrate and a Color Filter (CF) substrate which are cell-aligned, and Liquid Crystal (LC) molecules are disposed between the array substrate and the color filter substrate. An electric field for driving the liquid crystal to deflect is formed by controlling common electrodes and pixel electrodes, thereby achieving grayscale display.

With the maturity of TFT-LCD technology, large-size and super-large-size high-resolution liquid crystal display devices have developed rapidly in recent years, and their market share has gradually increased. With the increase of the size of liquid crystal display devices, poor problems such as horizontal stripes and dark light leakage are more serious, which have a great impact on product quality and yield.

SUMMARY

The following is a summary for subject matters described in detail herein. The summary is not intended to limit the scope of protection of claims.

In one aspect, the present disclosure provides a display panel, including a first substrate and a second substrate disposed opposite to each other.

The first substrate includes M*N subpixels defined by M gate lines and N pairs of data lines which intersect with each other, each pair of data lines includes a first data line and a second data line, and each of the subpixels includes a thin film transistor and a pixel electrode. The thin film transistors of all subpixels in the m-th display row are connected to a m-th gate line. In a n-th display column, thin film transistors of subpixels in odd display rows are connected to a first data line of an n-th pair of data lines, and thin film transistors of subpixels in even display rows are connected to a second data line of the n-th pair of data lines. Or, in the n-th display column, the thin film transistors of the subpixels in even display rows are connected to the first data line of the n-th pair of data lines, and the thin film transistors of subpixels in odd display rows are connected to the second data line of the n-th pair of data lines. M and N are both positive integers greater than or equal to 1, $m=1, 2, \ldots, M$, and $n=1, 2, \ldots, N$.

The second substrate includes M*N light filter units corresponding to the subpixels one-to-one, and a black matrix is disposed between adjacent light filter units, the black matrix includes a shielding row between adjacent display rows and a shielding column between adjacent display columns.

In an extending direction of the data line, a shielding row located between a k-th display row and a (k+1)-th display row has a first width, a shielding row located between the (k+1)-th display row and a (k+2)-th display row has a second width, and the first width is not equal to the second width.

In some possible implementations, multiple subpixels in the m-th display row include a first subpixel, a second subpixel and a third subpixel which are periodically arranged. In the shielding row located between the k-th display row and the (k+1)-th display row, the shielding row includes an upper edge located in the k-th display row and a lower edge located in the (k+1)-th display row. The upper edge includes a first upper edge located in a first subpixel of the k-th display row, a second upper edge located in a second subpixel of the k-th display row and a third upper edge located in the third subpixel of the k-th display row. The lower edge includes a first lower edge located in a first subpixel of the (k+1)-th display row, a second lower edge located in a second subpixel of the (k+1)-th display row and a third lower edge located in a third subpixel of the (k+1)-th display row. The shielding row located between the (k+1)-th display row and the (k+2)-th display row includes an upper edge located in the (k+1)-th display row and a lower edge located in the (k+2)-th display row. The upper edge includes a fourth upper edge located in a first subpixel of the (k+1)-th display row, a fifth upper edge located in a second subpixel of the (k+1)-th display row and a sixth upper edge located in a third subpixel of the (k+1)-th display row. The lower edge includes a fourth lower edge located in a first subpixel of the (k+2)-th display row, a fifth lower edge located in a second subpixel of the (k+2)-th display row and a sixth lower edge located in a third subpixel of the (k+2)-th display row. In an extending direction of the data lines, a distance between the first upper edge and the first lower edge is a first distance, a distance between the second upper edge and the second lower edge is a second distance, a distance between the third upper edge and the third lower edge is a third distance, a distance between the fourth upper edge and the fourth lower edge is a fourth distance, a distance between the fifth upper edge and the fifth lower edge is a fifth distance, and a distance between the sixth upper edge and the sixth lower edge is a sixth distance. The first width being not equal to the second width includes any one or more of the following: the first distance is smaller than the fourth distance, the second distance is smaller than the fifth distance, and the third distance is greater than the sixth distance.

In some possible implementations, the difference between the first distance and the fourth distance is 10 μm to 20 μm, the difference between the second distance and the fifth distance is 10 μm to 20 μm, and the difference between the third distance and the sixth distance is 1um to 5 μm.

In some possible implementations, the third distance is greater than the first distance and the third distance is greater than the second distance.

In some possible implementations, the difference between the third distance and the first distance is 10 μm to 35 μm, and the difference between the third distance and the second distance is 10 μm to 35 μm.

In some possible implementations, the sixth distance is greater than the fourth distance and the sixth distance is greater than the fifth distance.

In some possible implementations, the difference between the sixth distance and the fourth distance is 10 µm to 20 µm, and the difference between the sixth distance and the fifth distance is 10 µm to 20 µm.

In some possible implementations, the shielding row in the first subpixel of the k-th display row is provided with a first protrusion, which is disposed on the first upper edge and extends in a direction away from the first lower edge. The shielding row in the second subpixel of the k-th display row is provided with a second protrusion, which is disposed on the second upper edge and extends in a direction away from the second lower edge.

In some possible implementations, in an extending direction of the gate line, the first protrusion is located at a side of the first subpixel where the thin film transistor is disposed, and the second protrusion is located at a side of the second subpixel where the thin film transistor is disposed.

In some possible implementations, shapes of the first protrusion and the second protrusion include rectangle or trapezoid.

In some possible implementations, in the extending direction of the data lines, the first protrusion includes a first protrusion upper edge, the second protrusion includes a second protrusion upper edge, and a distance between the first protrusion upper edge and the first upper edge is 10 µm to 20 µm, and the distance between the second protrusion upper edge and the second upper edge is 10 µm to 20 µm.

In some possible implementations, in the extending direction of the data lines, a distance between the third upper edge and the first upper edge is greater than that between the first protrusion upper edge and the first upper edge, and a distance between the third upper edge and the second upper edge is greater than that between the second protrusion upper edge and the second upper edge.

In some possible implementations, the first lower edge, the second lower edge and the third lower edge are all straight edges extending along the extending direction of the gate lines. The fourth upper edge, the fifth upper edge and the sixth upper edge are all straight edges extending along the extending direction of the gate lines. The fourth lower edge, the fifth lower edge and the sixth lower edge each are all provided with bumps, and the bumps are respectively disposed at positions of the fourth lower edge, the fifth lower edge and the sixth lower edge adjacent to shielding columns at both sides.

In some possible implementations, the bumps include right triangles, first right-angled edges of which are respectively disposed on the fourth lower edge, the fifth lower edge and the sixth lower edge, and second right-angled edges of which are respectively disposed on the shielding columns at both sides of the fourth lower edge, the fifth lower edge and the sixth lower edge.

In some possible implementations, the first substrate includes a first conductive layer, a first metal layer, a first insulating layer, a semiconductor layer, a second metal layer, a second insulating layer and a second conductive layer which are stacked. The first conductive layer includes a common electrode disposed in each subpixel. The first metal layer includes a gate line, a common electrode line, a gate electrode disposed in each subpixel and a first connection electrode disposed in the third subpixel. The gate line is connected to the gate electrode in each subpixel, the common electrode line is connected to the common electrode in each subpixel, and the first connection electrode is connected to the common electrode of the third subpixel. The semiconductor layer includes an active layer disposed in each subpixel. The second metal layer includes a first data line, a second data line, and a source electrode and a drain electrode disposed in each subpixel. In the k-th display row, the source electrode of each subpixel is connected to the first data line, and in the (k+1)-th display row, the source electrode of each subpixel is connected to the second data line, and a conductive channel is formed between the source electrode and the drain electrode. The second conductive layer includes a pixel electrode disposed in each subpixel and a second connection electrode disposed in the third subpixel, the pixel electrode is connected to the drain electrode of the subpixel where the pixel electrode is located through a via, and the second connection electrode is connected to the first connection electrode and the common electrode line through the via respectively.

In some possible implementations, in the k-th display row, common electrodes of the first subpixel, the second subpixel and the third subpixel each are provided with a first common electrode protrusion, and the first common electrode protrusion of each subpixel is located at a side of the common electrode adjacent to the (k−1)-th display row. The common electrode in the third subpixel is provided with a second common electrode protrusion, which is located at a side of the common electrode adjacent to a next display row, and the first connection electrode is disposed on the second common electrode protrusion.

In some possible implementations, in a first interval region between adjacent common electrode lines, the common electrode lines have a third width, in a second interval region between adjacent first interval regions, the common electrode lines have a fourth width, and the third width is smaller than the fourth width. The gate line has a fifth width in the first interval region, and the gate line has a sixth width in the second interval region, and the fifth width is smaller than the sixth width.

In some possible implementations, gate electrodes in the first subpixel, the second subpixel and the third subpixel are all rectangular, long sides of the gate electrodes in the first subpixel and the second subpixel extend along a direction of the display rows, and a long side of the gate electrode in the third subpixel extend along a direction of the display columns.

In some possible implementations, one end of the second connection electrode is connected to the first connection electrode through vias on the first insulating layer and the second insulating layer, and the other end of the second connection electrode is connected to a common electrode line of the next display row through vias on the first insulating layer and the second insulating layer.

In some possible implementations, in each subpixel, a connection region between the pixel electrode and the drain electrode overlaps with the black matrix, and the edge region of the pixel electrode overlaps with the black matrix.

In some possible implementations, multiple light filter units in the k-th display row include a first light filter unit, a second light filter unit and a third light filter unit which are periodically arranged. The first light filter unit corresponds to the first subpixel, the second light filter unit corresponds to the second subpixel and the third light filter unit corresponds to the third subpixel. The first light filter unit includes a red light filter unit, the second light filter unit includes a green light filter unit and the third light filter unit includes a blue light filter unit.

In another aspect, the present disclosure provides a display device, including the aforementioned display panel.

Other aspects will become apparent upon reading and understanding accompanying drawings and the detailed description.

BRIEF DESCRIPTION OF DRAWINGS

Accompanying drawings are used to provide further understanding of technical solutions of the present disclosure, constitute a part of the specification, and explain the technical solutions of the present disclosure together with embodiments of the present disclosure, thus do not constitute a limitation on the technical solutions of the present disclosure. Shapes and sizes of various components in the accompanying drawings do not reflect true scale and are only intended to illustrate contents of the present disclosure.

DETAILED DESCRIPTION

Figure 1:
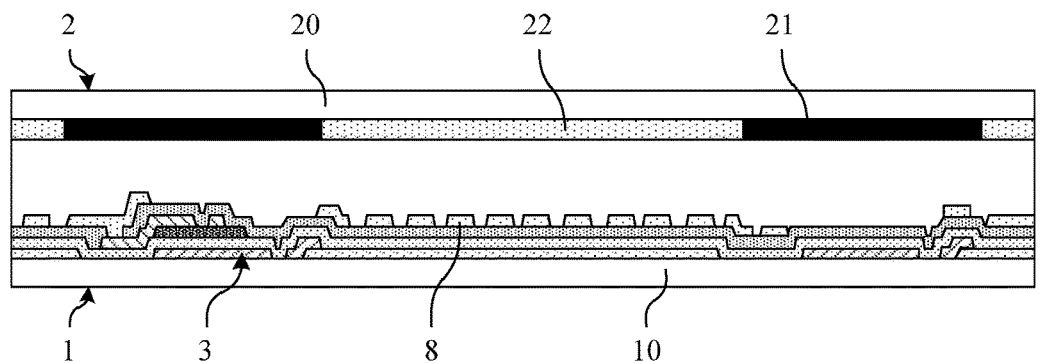
FIG. 1 is a schematic diagram of a structure of a display panel according to an exemplary embodiment of the present disclosure.

Implementations herein may be implemented in multiple different forms. Those of ordinary skills in the art may readily appreciate a fact that the implementations and contents may be varied into various forms without departing from the spirit and scope of the present disclosure. Therefore, the present disclosure should not be construed as only being limited to the contents recorded in the following embodiments. The embodiments in the present disclosure and features in the embodiments may be combined arbitrarily with each other without conflict.

In the accompanying drawings, a size of a constituent element, and a thickness of a layer or a region is sometimes exaggerated for clarity. Therefore, any one implementation of the present disclosure is not necessarily limited to dimensions shown in the drawings, and the shapes and sizes of the components in the accompanying drawings do not reflect actual scales. In addition, the accompanying drawings schematically show an ideal example, and any one implementation of the present disclosure is not limited to the shapes, values, or the like shown in the accompanying drawings.

Ordinal numerals such as "first", "second", and "third" herein are set to avoid confusion between constituent elements, but are not intended to limit in terms of quantity.

Herein, for convenience, wordings indicating orientations or positional relationships, such as "center", "upper", "lower", "front", "back", "vertical", "horizontal", "top", "bottom", "inside", "outside", and the like are used to describe the positional relationships between the constituent elements with reference to the accompanying drawings, and are merely for facilitating describing the implementations and simplifying the description, rather than indicating or implying that the referred apparatuses or elements must have particular orientations, and be constructed and operated in particular orientations. Thus, they cannot be construed as a limitation to the present disclosure. The positional relationships between the constituent elements may be appropriately changed according to directions according to which the constituent elements are described. Therefore, appropriate replacements may be made according to situations without being limited to the wordings described in the specification.

Herein, unless otherwise specified and defined explicitly, terms "mount", "mutually connect", "connect" and the like should be understood in a broad sense. For example, it may be a fixed connection, or a detachable connection, or an integral connection. It may be a mechanical connection or an electrical connection. It may be a direct connection, or an indirect connection through an intermediary, or connectivity inside two elements. Those of ordinary skills in the art may understand the meanings of the above terms in the present disclosure according to situations.

Herein, a transistor refers to an element at least including three terminals, i.e., a gate electrode, a drain electrode, and a source electrode. The transistor has a channel region between the drain electrode (or referred to as a drain electrode terminal, a drain region, or a drain electrode) and the source electrode (or referred to as a source electrode terminal, a source region, or a source electrode), and a current can flow through the drain electrode, the channel region, and the source electrode. Herein, the channel region refers to a region through which the current mainly flows.

Herein, a first electrode may be the drain electrode, and a second electrode may be the source electrode; or the first electrode may be the source electrode, and the second electrode may be the drain electrode. Herein, functions of the "source electrode" and the "drain electrode" may sometimes be exchanged, in a case that transistors with opposite polarities are used or a current direction changes during working of circuit. Therefore, the "source electrode" and the "drain electrode" may be exchanged herein.

Herein, "electrical connection" includes a case that constituent elements are connected together by an element with a certain electrical function. There is no specific restriction on the "element having some electrical function" as long as it may transmit and receive electrical signals between connected constituent elements. For example, the "element having some electrical function" may be electrodes or wirings, or switch elements, such as transistors, or other functional elements, such as resistors, inductors, capacitors, or the like.

Herein, "parallel" refers to a state in which an angle formed by two straight lines is above −10° and below 10°, and thus also includes a state in which the angle is above −5° and below 5°. In addition, "perpendicular" refers to a state in which an angle formed by two straight lines is greater than 80° and smaller than 100°, and thus may also include a state in which an angle is greater than 85° and smaller than 95°.

Herein, "film" and "layer" may be exchanged. For example, a "conductive layer" may be replaced with a "conductive film" sometimes. Similarly, an "insulating film" may be replaced with an "insulating layer" sometimes.

"About" herein refers to that a boundary is defined not so strictly and numerical values within process and measurement error ranges are allowed.

A liquid crystal display device scans in a row-by-row and column-by-column manner, and a timing control circuit (T-CON) controls the subpixels of the display device to be turned on row by row and column by column in an order from left to right and from top to bottom. For large-size and super-large-size liquid crystal display devices, as the number of gate lines and data lines increases, the lengths of gate lines and data lines also increase. When the scanning frequency is constant, the effective charging time of subpixels is greatly shortened. In order to ensure the charging rate of large-size and super-large-size high-resolution liquid crystal display devices, a pixel structure adopts gate line double-side driving and double data line structure, which is referred to as 2G2D driving. When the 2G2D driving is adopted, thin film transistors of one display row are disposed at a right side of a first data line, and thin film transistors of another adjacent display row are disposed at a left side of a second data line. It is found that the positions of thin film transistors in two adjacent display rows are different, which makes the subpixels in two adjacent display rows have different pixel aperture ratios. The difference in pixel aperture ratios not only leads to poor horizontal stripes, but also leads to poor dark light leakage when an array substrate and a color film substrate are misplaced.

The present disclosure provides a display panel, including a first substrate and a second substrate disposed opposite to each other. The first substrate includes M*N subpixels defined by M gate lines and N pairs of data lines which intersect with each other, each pair of data lines includes a first data line and a second data line, and each of the subpixels includes a thin film transistor and a pixel electrode. Thin film transistors of all subpixels in a m-th display row are connected to a m-th gate line. In a n-th display column, thin film transistors of subpixels in odd display rows are connected to a first data line of an n-th pair of data lines, and thin film transistors of subpixels in even display rows are connected to a second data lines of the n-th pair of data lines. Or, in an n-th display column, thin film transistors of subpixels in even display rows are connected to the first data line of the n-th pair of data lines, and thin film transistors of subpixels in odd display rows are connected to the second data line of the n-th pair of data lines. M and N are both positive integers greater than or equal to 1, m=1, 2, . . . , M, and n=1, 2, . . . , N.

The second substrate includes M*N light filter units corresponding to the subpixels, and a black matrix is disposed between adjacent light filter units, the black matrix includes shielding rows between adjacent display rows and shielding columns between adjacent display columns.

In an extending direction of the data lines, a shielding row located between a k-th display row and a (k+1)-th display row has a first width, a shielding row located between the (k+1)-th display row and a (k+2)-th display row has a second width, and the first width is not equal to the second width.

FIG. 1 is a schematic diagram of a structure of a display panel according to an exemplary embodiment of the present disclosure. As shown in FIG. 1, the display panel includes a first substrate 1 and a second substrate 2 disposed opposite to each other, and a liquid crystal layer (not shown) disposed between the first substrate 1 and the second substrate 2. The first substrate 1 at least includes a thin film transistor 3 and a pixel electrode 8 disposed on a first base substrate 10, and the second substrate 2 at least includes a black matrix 21 and a light filter unit 22 disposed on the second base substrate 20. The black matrix 21 of the second substrate 2 is configured to shield at least the thin film transistor 3 of the first substrate 1.

Figure 2:
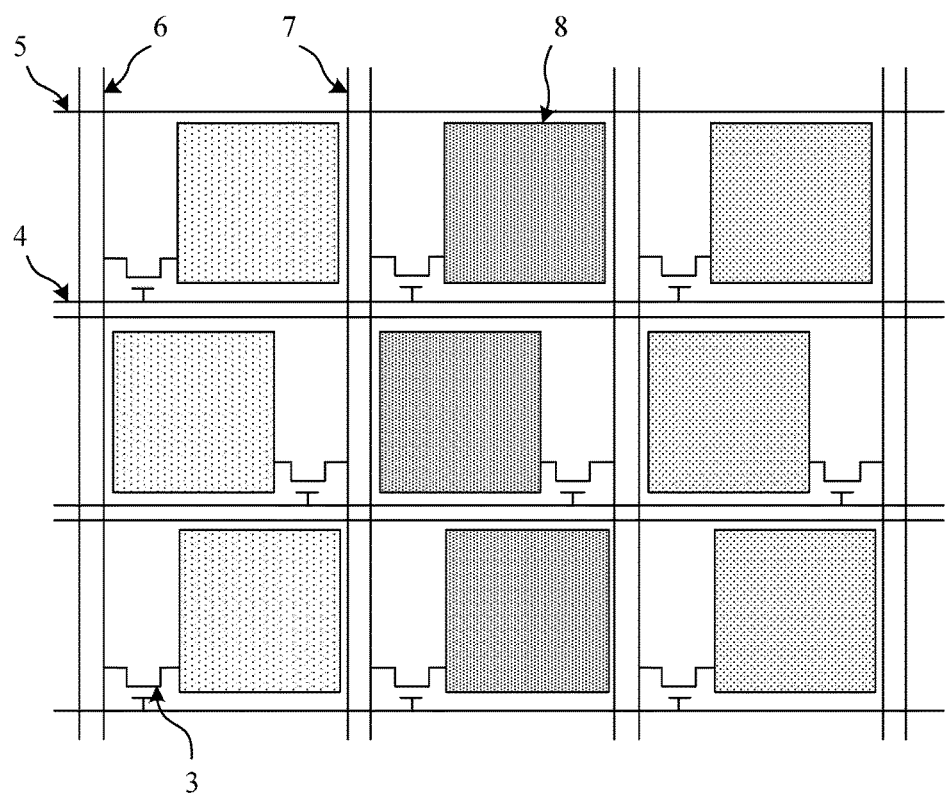
FIG. 2 is an equivalent circuit diagram of a first substrate according to an exemplary embodiment of the present disclosure.

FIG. 2 is an equivalent circuit diagram of a first substrate according to an exemplary embodiment of the present disclosure. As shown in FIG. 2, the first substrate 1 includes M gate lines 4, M common electrode lines 5 and N pairs of data lines, and each pair of data lines include a first data line 6 and a second data line 7. Multiple gate lines 4 and multiple common electrode lines 5 extending in a horizontal direction and disposed in parallel define M display rows, and multiple first data lines 6 and multiple second data lines 7 extending in a vertical direction and disposed in parallel define N display columns. Therefore, M gate lines 4, M common electrode lines 5, N first data lines 6 and N second data lines 7 intersect vertically to define M*N subpixels arranged in an array, and both M and N are positive integers greater than or equal to 1. Each subpixel includes a thin film transistor 3, a pixel electrode 8 and a common electrode 9. A source electrode of the thin film transistor 3 is connected to the first data line 6 or the second data line 7, a drain electrode of the thin film transistor 3 is connected to the pixel electrode 8 of the subpixel where t the thin film transistor 3 is located, and the common electrode 9 is connected to the common electrode line 5. In a display row, the gate line 4 is disposed at a side adjacent to a next display row, and the common electrode line 5 is disposed at a side adjacent to a previous display row, that is, the gate line 4 is disposed at a lower side of subpixels of this display row, and the common electrode line 5 is disposed at an upper side of subpixels of this display row. In a display column, the first data line 6 is disposed on a side adjacent to a previous display column (in this example, a left display column is the previous display column), and the second data line 7 is disposed on a side adjacent to a next display column (in this example, a right display column is the next display column), that is, the first data line 6 is disposed at a left side of subpixels of this display column and between this display column and the left display column, and the second data line 7 is disposed at a right side of subpixels of this display column and between this display column and the right display column. M display rows include M/2 odd display rows and M/2 even display rows. Thin film transistors 3 of subpixels in M/2 odd display rows are connected to the first data line 6, and thin film transistors 3 of subpixels in M/2 even display rows are connected to the second data line 7.

In an exemplary embodiment, the second substrate 2 includes M*N light filter units 22 disposed in an array, the M*N light filter units 22 are in one-to-one correspondence with the positions of the M*N subpixels, and a black matrix 21 is disposed between two adjacent light filter units 22.

Figure 3:
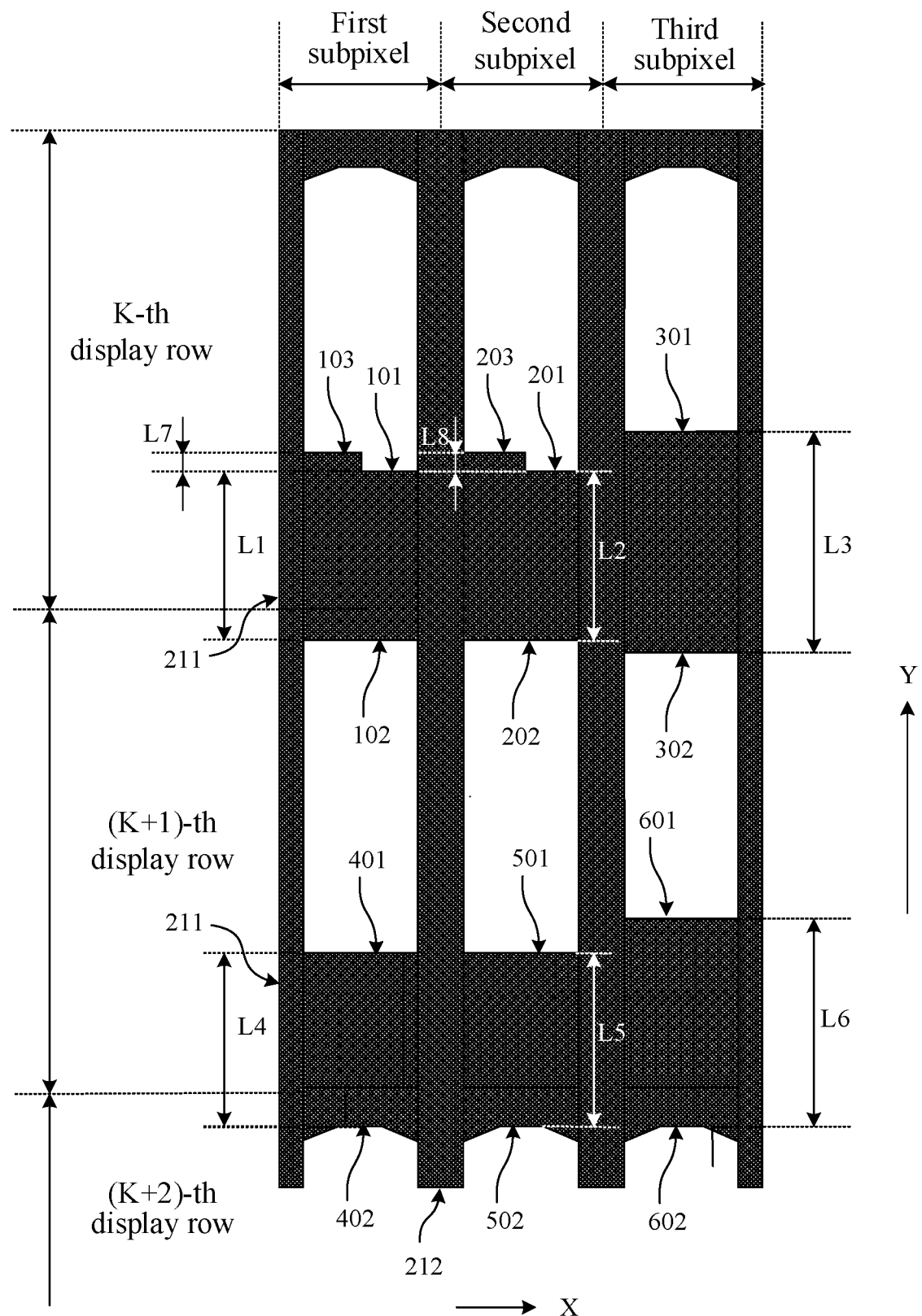
FIG. 3 is a top view of a display panel according to an exemplary embodiment of the present disclosure.

FIG. 3 is a top view of a display panel according to an exemplary embodiment of the present disclosure, which illustrates the black matrix 21 and the light filter unit 22 of 2 display rows and 3 display columns in the display panel. In an exemplary embodiment, the 2 display rows are the k-th display row and the (k+1)-th display row respectively, the k-th display row and the (k+2)-th display row are odd display rows, and the (k+1)-th display row is an even display row.

In an exemplary embodiment, each display row of the first substrate 1 includes a first subpixel, a second subpixel and a third subpixel which are periodically arranged along the direction of the display rows. Each display row of the second substrate 2 includes a first light filter unit, a second light filter unit and a third light filter unit which are periodically arranged along the direction of the display rows. A position of the first light filter unit corresponds to that of the first subpixel; a position of the second light filter unit corresponds to that of the second subpixel; and a position of the third light filter unit corresponds to that of the third subpixel. Since the light filter units of the second substrate 2 correspond to the subpixels of the first substrate 1 one by one, in the subsequent description of the present disclosure, the subpixels of the first substrate 1 and the light filter units of the second substrate 2 are uniformly explained as subpixels.

In an exemplary embodiment, in the second substrate 2, the black matrix 21 is located between two adjacent subpixels (light filter units), and includes a shielding row 211 located between subpixels of adjacent display rows and a shielding column 212 located between subpixels of adjacent display columns. The shielding row 211 is configured to shield the gate lines, common electrode lines and thin film transistors of the first substrate 1, and the shielding column 212 is configured to shield the first and second data lines of the first substrate 1.

In an exemplary embodiment, in an extending direction Y of the data lines, the shielding row 211 located between the subpixels of the k-th display row and the subpixels of the (k+1)-th display row has a first width, the shielding row 211 located between the subpixels of the (k+1)-th display row and the subpixels of the (k+2)-th display row has a second width, and the first width is not equal to the second width. Thin film transistors of subpixels in the k-th display row and the (k+2)-th display row are connected to the first data line, and thin film transistors of subpixels in the (k+1)-th display row are connected to the second data line. That is, if k is an odd number, it is provided that the shielding row between the k-th (odd) display row and the (k+1)-th (even) display row has the first width, the shielding row between the (k+1)-th (even) display row and the (k+2)-th (odd) display row has the second width, and the first width is not equal to the second width. Or, if k is an even number, it is provided that the shielding row between the k-th (even) display row and the (k+1)-th (odd) display row has the first width, the shielding row between the (k+1)-th (odd) display row and the (k+2)-th (even) display row has the second width, and the first width is not equal to the second width. In the present disclosure, the extending direction Y of the data lines refers to a direction parallel to the data lines.

In an exemplary embodiment, the shielding row 211 located between the subpixels of the k-th display row and the subpixels of the (k+1)-th display row includes an upper edge located in the k-th display row and a lower edge located in the (k+1)-th display row. The upper edge located in the k-th display row includes a first upper edge 101 located in the first subpixel of the k-th display row, a second upper edge 201 located in the second subpixel of the k-th display row and a third upper edge 301 located in the third subpixel of the k-th display row. The lower edge located in the (k+1)-th display row includes a first lower edge 102 located in the first subpixel of the (k+1)-th display row, a second lower edge 202 located in the second subpixel of the (k+1)-th display row and a third lower edge 302 located in the third subpixel of the (k+1)-th display row. In the extending direction Y of the data lines, a distance between the first upper edge 101 and the first lower edge 102 is a first distance L1, a distance between the second upper edge 201 and the second lower edge 202 is a second distance L2, and a distance between the third upper edge 301 and the third lower edge 302 is a third distance L3.

In an exemplary embodiment, the shielding row 211 located between the subpixels of the (k+1)-th display row and the subpixels of the (k+2)-th display row includes an upper edge located in the (k+1)-th display row and a lower edge located in the (k+2)-th display row. The upper edge located in the (k+1)-th display row includes a fourth upper edge 401 located in the first subpixel of the (k+1)-th display row, a fifth upper edge 501 located in the second subpixel of the (k+1)-th display row and a sixth upper edge 601 located in the third subpixel of the (k+1)-th display row. The lower edge located in the (k+2)-th display row includes a fourth lower edge 402 located in the first subpixel of the (k+2)-th display row, a fifth lower edge 502 located in the second subpixel of the (k+2)-th display row and a sixth lower edge 602 located in the third subpixel of the (k+2)-th display row. In the extending direction Y of the data lines, a distance between the fourth upper edge 401 and the fourth lower edge 402 is a fourth distance L4, a distance between the fifth upper edge 501 and the fifth lower edge 502 is a fifth distance L5, and a distance between the sixth upper edge 601 and the sixth lower edge 602 is a sixth distance L6.

In an exemplary embodiment, the first width being not equal to the second width includes any one or more of the following: the first distance L1 is smaller than the fourth distance L4, the second distance L2 is smaller than the fifth distance L5, and the third distance L3 is greater than the sixth distance L6.

In an exemplary embodiment, the difference between the first distance L1 and the fourth distance L4 is about 10 μm to 20 μm, the difference between the second distance L2 and the fifth distance L5 is about 10 μm to 20 μm, and the difference between the third distance L3 and the sixth distance L6 is about 1 μm to 5 μm. In some possible implementations, the difference between the first distance L1 and the fourth distance L4 is about 13 μm to 15 μm, the difference between the second distance L2 and the fifth distance L5 is about 13 μm to 15 μm, and the difference between the third distance L3 and the sixth distance L6 is about 2.5 μm to 3.5 μm.

In an exemplary embodiment, the third distance L3 is greater than the first distance L1, the third distance L3 is greater than the second distance L2, and the first distance L1 is equal to the second distance L2.

In some possible implementations, the difference between the third distance L3 and the first distance L1 is about 10 μm to 35 μm, and the difference between the third distance L3 and the second distance L2 is about 10 μm to 35 μm.

In an exemplary embodiment, the sixth distance L6 is greater than the fourth distance L4, the sixth distance L6 is greater than the fifth distance L5, and the fourth distance L4 is equal to the fifth distance L5.

In some possible implementations, the difference between the sixth distance L6 and the fourth distance L4 is about 10 μm to 20 μm, and the difference between the sixth distance L6 and the fifth distance L5 is about 10 μm to 20 μm.

In an exemplary embodiment, the shielding row located in the first subpixel of the k-th display row is provided with a first protrusion 103, and the shielding row located in the second subpixel of the k-th display row is provided with a second protrusion 203. The first protrusion 103 is disposed on the first upper edge 101 and extends in a direction away from the first lower edge 102, and the second protrusion 203 is disposed on the second upper edge 201 and extends in a direction away from the second lower edge 202.

In an exemplary embodiment, in the extending direction X of the gate lines, the first protrusion 103 is located at a side in the first subpixel where the thin film transistor is disposed, and the second protrusion 203 is located at a side in the second subpixel where the thin film transistor is disposed. Since the k-th display row is an odd display row, and the thin film transistor of the subpixel in the k-th display row is connected to the first data line located at a left side of the subpixel, the thin film transistor of the subpixel in the k-th display row is located at a left side of the subpixel, the first protrusion 103 is located at a left side of the first subpixel and the second protrusion 203 is located at left side of the second subpixel. In the present disclosure, the extending direction X of the gate lines refers to a direction parallel to the gate line.

In an exemplary embodiment, in a plane parallel to the display panel, shapes of the first protrusion 103 and the second protrusion 203 may include rectangle or trapezoid.

In an exemplary embodiment, the shapes of the first protrusion 103 and the second protrusion 203 are rectangle or trapezoid. The first protrusion 103 includes a first protrusion upper edge and the second protrusion 203 includes a second protrusion upper edge. In the extending direction Y of the data lines, a distance L7 between the first protrusion upper edge and the first upper edge 101 is about 10 μm to 20 μm, and a distance L8 between the second protrusion upper edge and the second upper edge 201 is about 10 μm to 20 μm.

In an exemplary embodiment, in the extending direction Y of the data lines, the distance between the third upper edge 301 and the first upper edge 101 is greater than the distance L7 between the first protrusion upper edge and the first upper edge 101, and the distance between the third upper edge 301 and the second upper edge 201 is greater than the distance L8 between the second protrusion upper edge and the second upper edge 201.

In an exemplary embodiment, the first lower edge, the second lower edge and the third lower edge are all straight edges extending along the extending direction of the gate lines. The fourth upper edge, the fifth upper edge and the sixth upper edge are all straight edges extending along the extending direction of the gate lines. The fourth lower edge, the fifth lower edge and the sixth lower edge are all provided with bumps, and the bumps are respectively disposed at positions of the fourth lower edge, the fifth lower edge and the sixth lower edge adjacent to the shielding columns on both sides.

In an exemplary embodiment, the bumps include right triangles, first right-angled edges of which are respectively disposed on the fourth lower edge, the fifth lower edge and the sixth lower edge, and second right-angled edges of which are respectively disposed on the shielding columns on both sides of the fourth lower edge, the fifth lower edge and the sixth lower edge.

In an exemplary embodiment, the first substrate includes a first conductive layer, a first metal layer, a first insulating layer, a semiconductor layer, a second metal layer, a second insulating layer and a second conductive layer which are stacked. The first conductive layer includes a common electrode disposed in each subpixel. The first metal layer includes a gate line, a common electrode line, a gate electrode disposed in each subpixel and a first connection electrode disposed in the third subpixel. The gate line is connected to the gate electrode in each subpixel, the common electrode line is connected to the common electrode in each subpixel, and the first connection electrode is connected to the common electrode of the third subpixel. The semiconductor layer includes an active layer disposed in each subpixel. The second metal layer includes a first data line, a second data line, and a source electrode and a drain electrode disposed in each subpixel. In the k-th display row, the source electrode of each subpixel is connected to the first data line, and in the (k+1)-th display row, the source electrode of each subpixel is connected to the second data line, and a conductive channel is formed between the source electrode and the drain electrode. The second conductive layer includes a pixel electrode disposed in each subpixel and a second connection electrode disposed in the third subpixel, the pixel electrode is connected to the drain electrode of the subpixel where the pixel electrode is located through a via, and the second connection electrode is connected to the first connection electrode and the common electrode line through the via respectively.

In an exemplary embodiment, in the k-th display row, the common electrodes of the first subpixel, the second subpixel and the third subpixel each are provided with a first common electrode protrusion, and the first common electrode protrusion of each subpixel is located at a side of the common electrode adjacent to the (k−1)-th display row. The common electrode in the third subpixel is provided with a second common electrode protrusion, which is located at a side of the common electrode adjacent to a next display row, and the first connection electrode is disposed on the second common electrode protrusion.

In an exemplary embodiment, in a first interval region between adjacent common electrode lines, the common electrode lines have a third width, in a second interval region between adjacent first interval regions, the common electrode lines have a fourth width, and the third width is smaller than the fourth width. In the first interval region, the gate line has a fifth width, and in the second interval region, the gate line has a sixth width, and the fifth width is smaller than the sixth width.

In an exemplary embodiment, the gate electrodes in the first subpixel, the second subpixel and the third subpixel each are rectangular, long sides of the gate electrodes in the first subpixel and the second subpixel extend along a direction of the display rows, and a long side of the gate electrode in the third subpixel extend along a direction of the display columns.

In an exemplary embodiment, one end of the second connection electrode is connected to the first connection electrode through vias on the first insulating layer and the second insulating layer, and the other end of the second connection electrode is connected to the common electrode line of a next display row through vias on the first insulating layer and the second insulating layer.

In an exemplary embodiment, in each subpixel, the connection region between the pixel electrode and the drain electrode overlaps with the black matrix, and the edge region of the pixel electrode overlaps with the black matrix.

In an exemplary embodiment, the first subpixel (the first light filter unit) is a red subpixel (red light filter unit), the second subpixel (the second light filter unit) is a green subpixel (green light filter unit), and the third subpixel (the third light filter unit) is a blue subpixel (blue light filter unit).

A process for preparing a display panel is described schematically below. A "patterning process" mentioned in the present disclosure includes film layer deposition, photoresist coating, masking, exposure, development, etching, and photoresist stripping. Deposition may be any one or more of sputtering, evaporation, and chemical vapor deposition. Coating may be any one or more of spray coating and spin coating. Etching may be any one or more of dry etching and wet etching. The "thin film" refers to a thin film layer prepared from a certain material on a substrate by a process of depositing or coating. If the patterning process is not needed for the "thin film" in the whole preparation process, the "thin film" may also be referred to as a "layer". When the patterning process is needed for the "thin film" in the whole preparation process, the thin film is referred to as a "thin film" before the patterning process and referred to as a "layer" after the patterning process. The "layer" after the patterning process includes at least one "pattern". That "A and B are disposed in the same layer" mentioned in the present disclosure refers to that A and B are simultaneously formed by the same patterning process. In an exemplary embodiment of the present disclosure, "an orthographic projection of A includes an orthographic projection of B refers to "that a boundary of an orthographic projection of B falls within a boundary of an orthographic projection of A, or the boundary of the orthographic projection of A fully overlaps with the boundary of the orthographic projection of B.

In an exemplary embodiment, the preparation process of the display panel may include two parts, Part I includes substrate preparation, and Part II includes alignment pressing (cell alignment). In an exemplary embodiment, the substrate preparation includes first substrate preparation and second substrate preparation, which have no order requirement and may be carried out simultaneously. In an exemplary embodiment, the first substrate may be an array substrate and the second substrate may be a color film substrate. The following describes the two-part processing acts respectively.

I. Preparation of an Array Substrate in Part I

FIG. 4A to FIG. 9C illustrate the preparation process of the array substrate, and the array substrate has a structure of six subpixels in two display rows and three display columns. In an exemplary embodiment, the k-th display row and the (k+2)-th display row may be odd rows, and the (k+1)-th display row may be an even row. Each display row may include a first subpixel, a second subpixel and a third subpixel, which respectively correspond to a first light filter unit, a second light filter unit and a third light filter unit of the color film substrate.

Figure 4A:
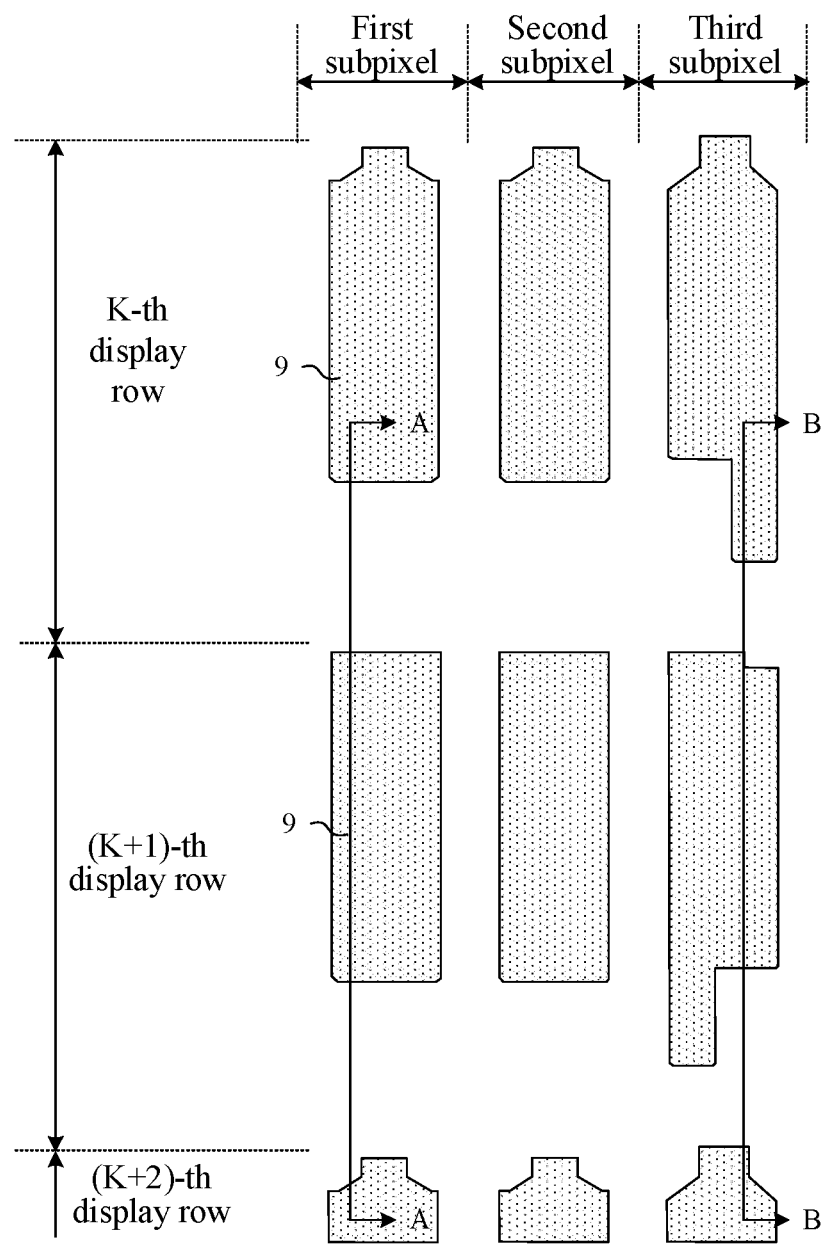
FIG. 4A is a schematic diagram after formation of a pattern of a first conductive layer according to an exemplary embodiment of the present disclosure.
Figure 4B:
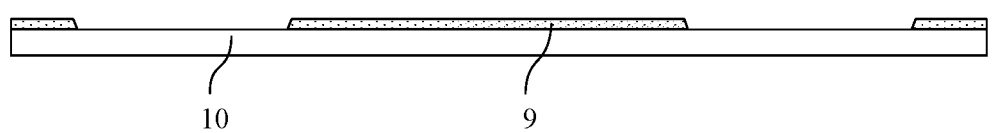
FIG. 4B is a sectional view taken along an A-A direction in FIG. 4A.
Figure 4C:
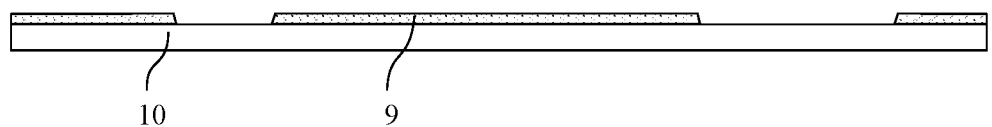
FIG. 4C is a sectional view taken along a B-B direction in FIG. 4A.

(1) A pattern of a first conductive layer is formed. In an exemplary embodiment, forming of the pattern of first conductive layer may include: depositing a first transparent conductive thin film on a first base substrate, and patterning the first transparent conductive thin film by a patterning process, so as to form the pattern of the first conductive layer on the first base substrate 10, the pattern of the first conductive layer at least includes a common electrode 9 disposed in each subpixel, as shown in FIG. 4A, FIG. 4B and FIG. 4C, FIG. 4B is a sectional view taken along an A-A direction in FIG. 4A, and FIG. 4C is a sectional view taken along a B-B direction in FIG. 4A.

In an exemplary embodiment, in each display row, the common electrode 9 is a plate electrode, the common electrodes 9 of the first subpixel and the second subpixel have the same shape and size, the shape and size of the common electrode 9 of the third subpixel are different from those of the common electrodes 9 of the first subpixel and the second subpixel, the shape and size of the common electrode 9 of the first subpixel of the k-th display row are different from those of the common electrode 9 of the first subpixel of the (k+1)-th display row, the shape and size of the common electrode 9 of the second subpixel of the k-th display row are different from those of the common electrode 9 of the second subpixel of the (k+1)-th display row, and the shape and size of the common electrode 9 of the third subpixel of the k-th display row are different from those of the common electrode 9 of the third subpixel of the (k+1)-th display row.

In an exemplary embodiment, the common electrodes 9 in the first, second and third subpixels of the k-th display row each are provided with a first common electrode protrusion, the first common electrode protrusion of each subpixel is located at a side of the common electrode 9 adjacent to the k-th display row, and the first common electrode protrusion of each subpixel is configured to be connected to a subsequently formed common electrode line, so as to achieve the mutual connection of the common electrodes 9 of all subpixels in the direction of the display rows.

In an exemplary embodiment, the common electrodes 9 in the third subpixel of the k-th display row and the third subpixel of the (k+1)-th display row each are provided with a second common electrode protrusion. The second common electrode protrusion of the third subpixel of the k-th display row is located on a side of the common electrode 9 adjacent to the (k+1)-th display row, and the second common electrode protrusion of the third subpixel of the (k+1)-th display row is located on a side of the common electrode 9 adjacent to the (k+2)-th display row. The second common electrode protrusion is configured to connect the common electrode 9 in the third subpixel of the k-th display row to the common electrode 9 in the third subpixel of the (k+1)-th display row through a first connection electrode and a second connection electrode which are subsequently formed, so as to achieve the mutual connection of the common electrodes 9 of the third subpixels in the direction of the display columns. Since the common electrodes 9 of all subpixels in the direction of the display rows are connected to each other through a common electrode line 5, and the common electrodes 9 of all third subpixels in the direction of the display columns are connected to each other through the second common electrode protrusion, the first connection electrode, the second connection electrode and the common electrode line 5, the common electrodes 9 of all subpixels are connected to each other, so that the common electrodes 9 of all subpixels have the same potential, thereby improving the display effect of the display panel.

In an exemplary embodiment, in the k-th display row, a partial region of an orthographic projection of the common electrode line 5 on the base substrate 10 overlaps with a partial region of an orthographic projection of the common electrode 9 on the base substrate 10. That is, one part of the common electrode line 5 is disposed on the common electrode 9, and the other part is disposed on the base substrate 10. In the (k+1)-th display row, all regions of the orthographic projection of the common electrode line 5 on the base substrate 10 overlap with a partial region of the orthographic projection of the common electrode 9 on the base substrate 10. That is, the common electrode line 5 is disposed on the common electrode 9.

Figure 5A:
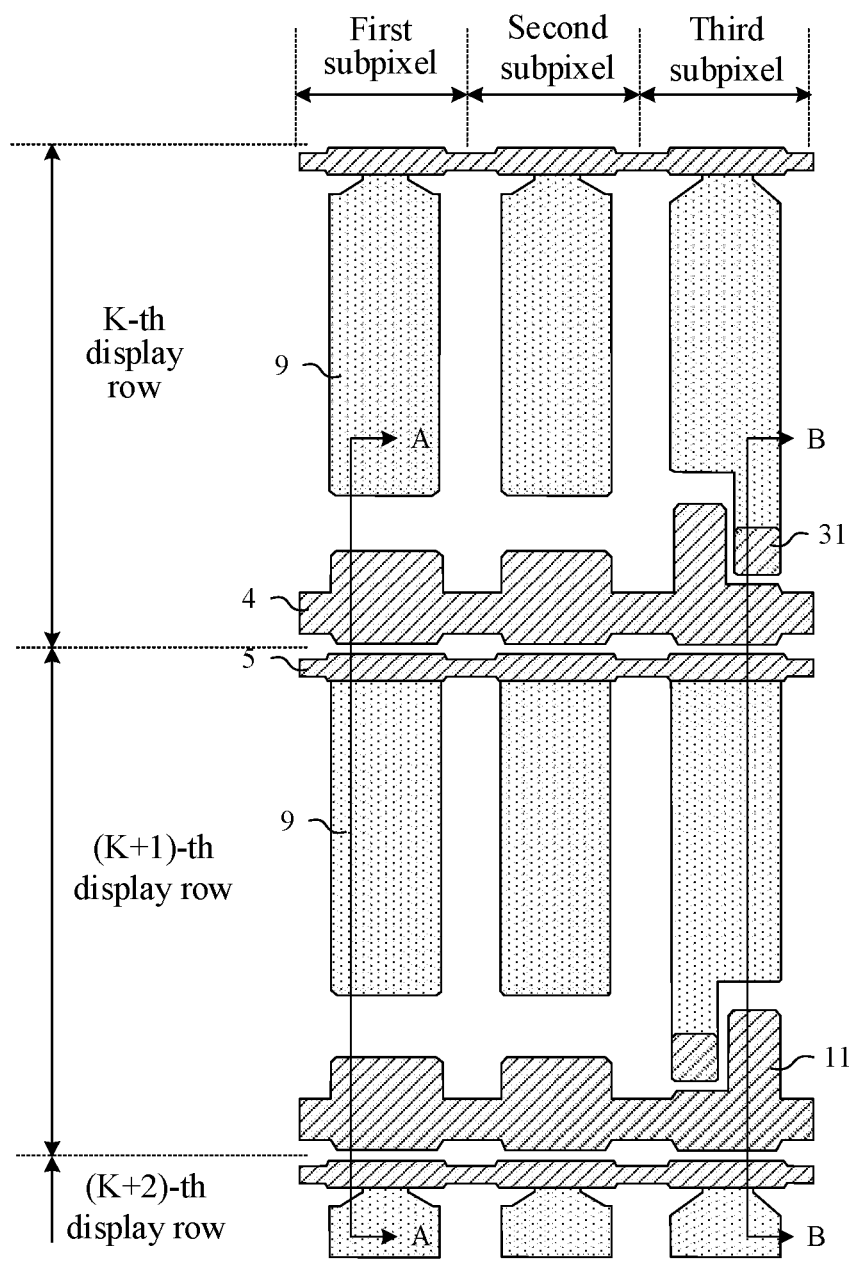
FIG. 5A is a schematic diagram after formation of a pattern of a first metal layer according to an exemplary embodiment of the present disclosure.
Figure 5B:
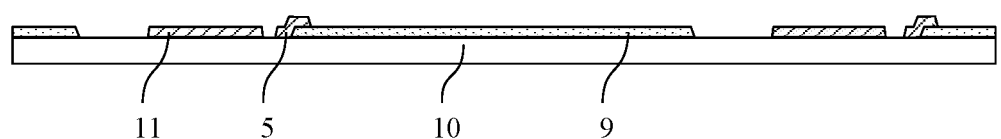
FIG. 5B is a sectional view taken along an A-A direction in FIG. 5A.
Figure 5C:
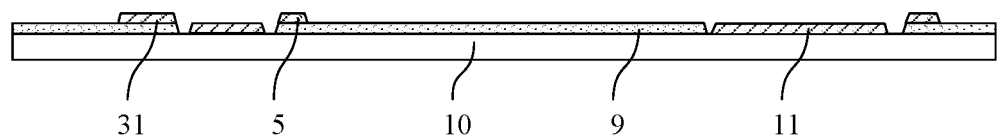
FIG. 5C is a sectional view taken along a B-B direction in FIG. 5A.

(2) A pattern of a first metal layer is formed. In an exemplary embodiment, forming of the pattern of the first metal layer may include: depositing a first metal thin film on the first base substrate on which the aforementioned pattern is formed, patterning the first metal thin film by a patterning process, so as to form the pattern of the first metal layer on the first base substrate 10, the pattern of the first metal layer at least includes a gate line 4 and a common electrode line 5 extending in a horizontal direction, a gate electrode 11 disposed in each subpixel, and a first connection electrode 31 disposed in the third subpixel, as shown in FIG. 5A, FIG. 5B and FIG. 5C, FIG. 5B is a sectional view taken along an A-A direction in FIG. 5A, and FIG. 5C is a sectional view taken along a B-B direction in FIG. 5A.

In an exemplary embodiment, the gate line 4 of each display row is disposed at a lower side of this display row, spaced apart from the common electrode 9 of each subpixel in this display row by a certain distance, and the common electrode line 5 parallel to the gate line 4 is disposed at an upper side of this display row, and erected on the common electrode 9 of each subpixel in this display row, so as to achieve the connection between the common electrode line 5 and the common electrode 9 of each subpixel in the direction of the display rows. In each subpixel, the gate electrode 11 is connected to the gate line 4 in an integral structure. The first connection electrode 31 located in the third subpixel is disposed on the second common electrode protrusion of the common electrode 9 in the third subpixel to achieve the connection between the first connection electrode 31 and the common electrode 9 of the third subpixel. In the k-th display row, the first connection electrode 31 is disposed at a right side of the gate electrode 11 of the third subpixel, and in the (k+1)-th display row, the first connection electrode 31 is disposed at a left side of the gate electrode 11 of the third subpixel.

In an exemplary embodiment, the common electrode lines 5 disposed in the horizontal direction may be provided with unequal widths. In a first interval region between adjacent common electrode lines 5, the common electrode lines 5 have a third width, and in a second interval region between adjacent first interval regions, the common electrode lines 5 have a fourth width. The third width is smaller than the fourth width. In the second interval region, since the common electrode line 5 is connected to the common electrode 9, the wider common electrode line 5 may ensure the reliable connection between the common electrode line 5 and the common electrode 9. In the subsequent process, data lines are disposed in the first interval region between adjacent common electrode lines 5. Thinner common electrode lines 5 may make the common electrode lines 5 and the subsequently formed data lines have a smaller overlapping area, which is equivalent to that the common electrode lines 5 are designed to be thinned in the overlapping region with the data lines, so that the parasitic capacitance between the common electrode lines 5 and the data lines may be reduced, thereby improving the electrical performance of the display panel. In an embodiment of the present disclosure, the width of the common electrode line refers to a size of the common electrode line in a direction perpendicular to the common electrode line.

In an exemplary embodiment, the gate lines 4 disposed in the horizontal direction may be provided with unequal widths. the gate lines 4 have a fifth width in the first interval region between adjacent common electrode lines 5, and the gate lines 4 have a sixth width in the second interval region between adjacent first interval regions. The fifth width is smaller than the sixth width. In the second interval region, since the gate line 4 is connected to the gate electrode 11, the wider gate line 4 may increase the area of the gate electrode 11 and improve the electrical performance of the thin film transistor. In the subsequent process, data lines are disposed in the first interval region between adjacent common electrode lines 5. Thinner gate lines 4 may make the gate lines 4 and the subsequently formed data lines have a smaller overlapping area, which is equivalent to that the gate lines 4 are designed to be thinned in the overlapping area with the data lines, so that the parasitic capacitance between the gate lines 4 and the data lines can be reduced, thereby improving the electrical performance of the display panel. In an embodiment of the present disclosure, the width of the gate line refers to a size of the gate line in a direction perpendicular to the gate line.

In an embodiment of the present disclosure, gate electrodes 11 in the first subpixel, the second subpixel and the third subpixel are all rectangular, the long sides of the gate electrodes 11 in the first subpixel and the second subpixel extend along the direction of the display rows, and the long sides of the gate electrode 11 in the third subpixel extend along the direction of the display columns. In the direction perpendicular to the gate line, the distance between the upper edge of the gate electrode 11 and the gate line 4 in the third subpixel is larger than that between the upper edge of the gate electrode 11 and the gate line 4 in the first and second subpixels. In the direction parallel to the gate line, the distance between the two edges of the gate electrode 11 in the third subpixel is smaller than the distance between the two edges of the gate electrode 11 in the first subpixel and the second subpixel. Since the common electrode 9 in the third subpixel is provided with the second common electrode protrusion extending toward the gate line 4, the gate electrode 11 in the third subpixel is designed in a rectangular shape extending toward the common electrode 9 to ensure the area of the gate electrode 11 in the third subpixel.

Figure 6A:
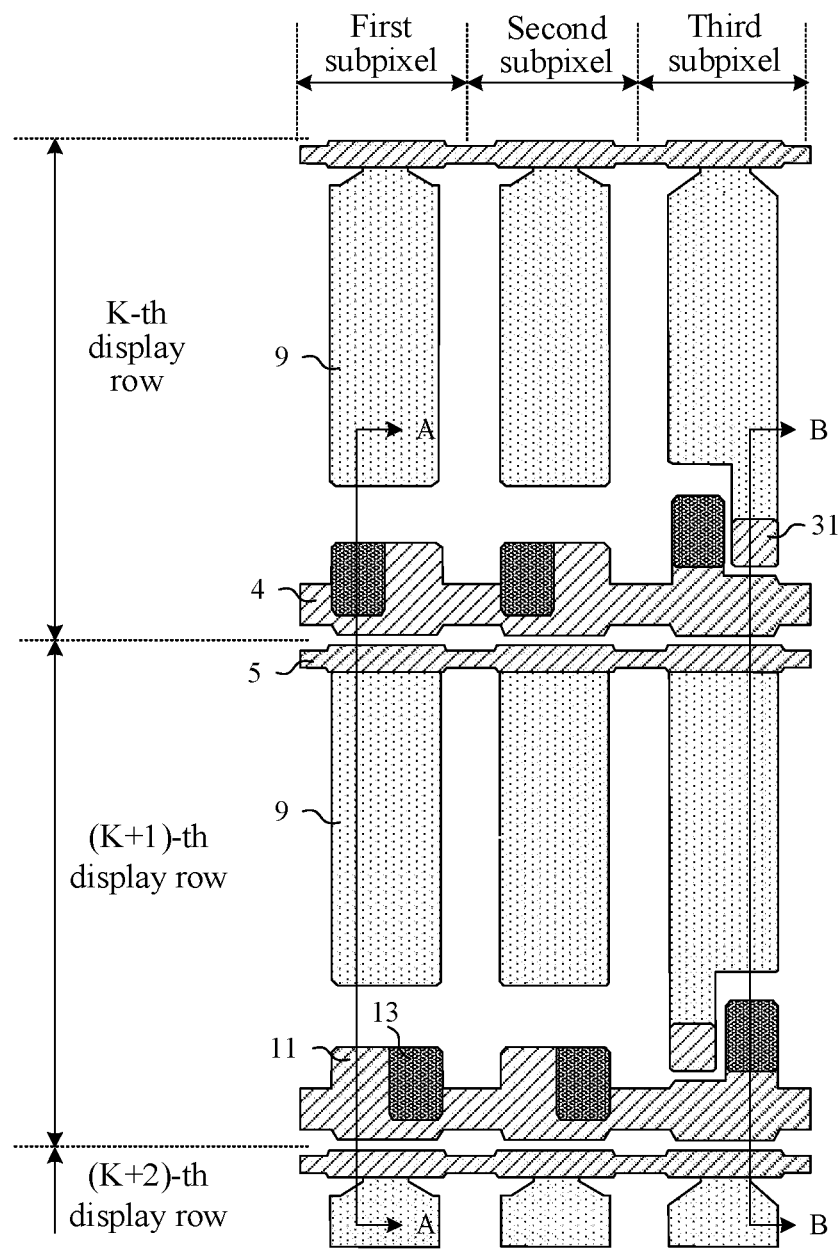
FIG. 6A is a schematic diagram after formation of a pattern of a semiconductor layer according to an exemplary embodiment of the present disclosure.
Figure 6B:
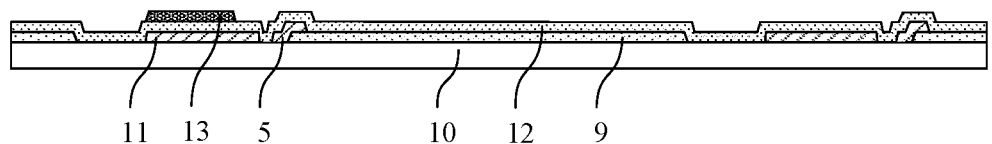
FIG. 6B is a sectional view taken along an A-A direction in FIG. 6A.
Figure 6C:
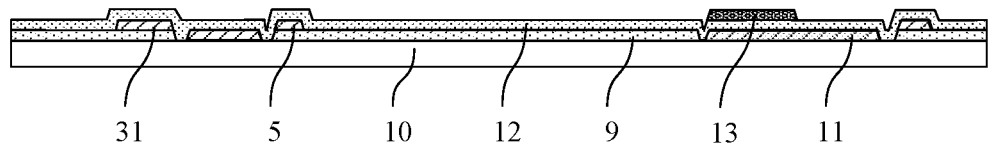
FIG. 6C is a sectional view taken along a B-B direction in FIG. 6A.

(3) A pattern of a semiconductor layer is formed. In an exemplary embodiment, forming of the pattern of the semiconductor layer may include: sequentially depositing a first insulating thin film and a semiconductor layer thin film on the first base substrate on which the aforementioned pattern is formed, and patterning the semiconductor layer thin film by a patterning process, so as to form the first insulating layer 12 covering the pattern of the first metal layer and the pattern of the first conductive layer, and the pattern of the semiconductor layer disposed on the first insulating layer 12. The semiconductor layer pattern includes at least an active layer 13 disposed in each subpixel, and a position of each active layer 13 corresponds to a position of a gate electrode 11 in the subpixel where the active layer 13 is located, as shown in FIG. 6A, FIG. 6B and FIG. 6C, FIG. 6B is a sectional view taken along an A-A direction in FIG. 6A, and FIG. 6C is a sectional view taken along a B-B direction in FIG. 6A.

In an exemplary embodiment, the shape of the active layer 13 in each subpixel may be the same, and the position of the active layer 13 in each subpixel in the k-th display row is different from those of the active layer 13 in each subpixel in the (k+1)-th display row.

In an exemplary embodiment, since the k-th display row is an odd row, and the thin film transistors in the first subpixel, the second subpixel and the third subpixel are connected to the first data line located at a left side of the subpixels, the active layer 13 in the k-th display row is located at a side (left side) close to the first data line, which may simplify the structure of the source electrodes in the thin film transistors, reduce the parasitic capacitance between the source electrode and the gate electrode, and improve the electrical performance of the thin film transistors. Since the (k+1)-th display row is an even row, the thin film transistors in the first subpixel, the second subpixel and the third subpixel are connected to the second data line located at a right side of the subpixels, the active layer 13 in the (k+1)-th display row is located at a side (right side) close to the second data line, which may simplify the structure of the source electrodes in the thin film transistors, reduce the parasitic capacitance between the source electrode and the gate electrode, and improve the electrical performance of the thin film transistors.

Figure 7A:
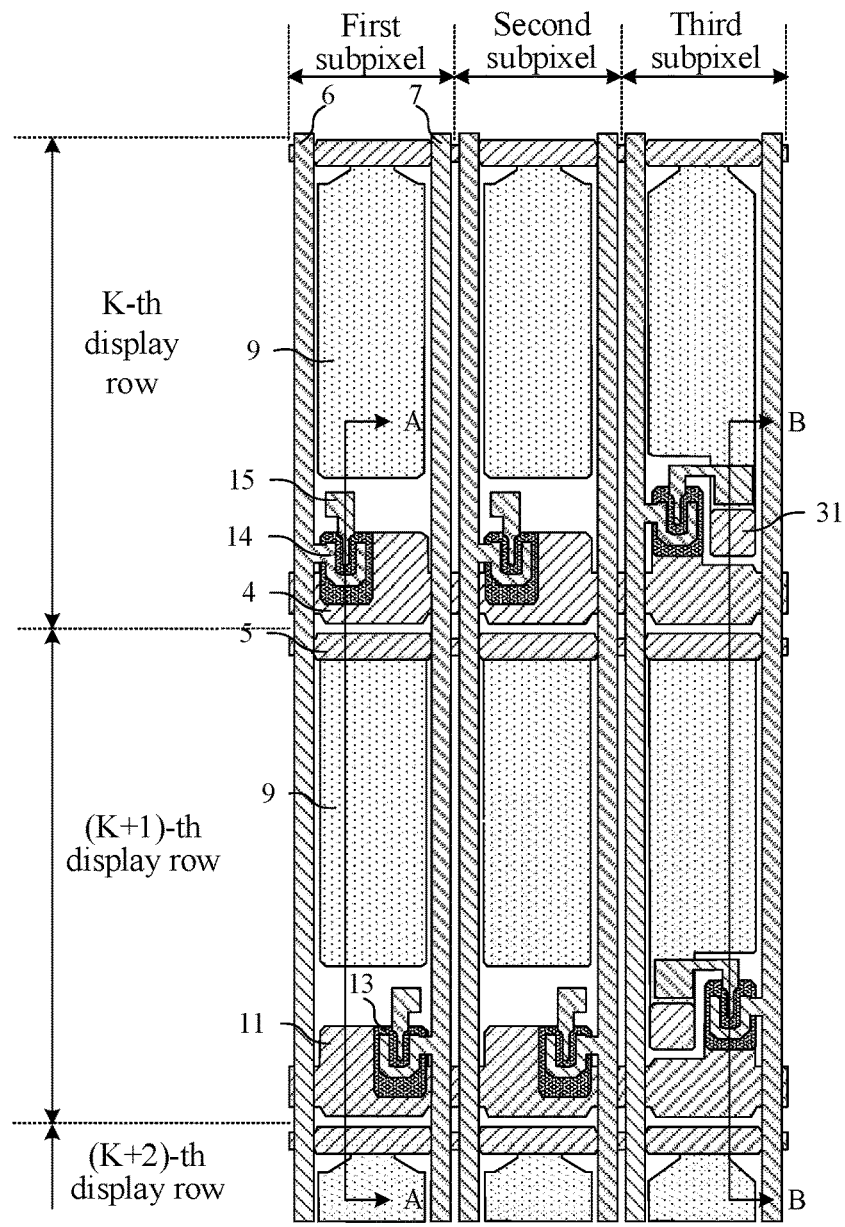
FIG. 7A is a schematic diagram after formation of a pattern of a second metal layer according to an exemplary embodiment of the present disclosure.
Figure 7B:
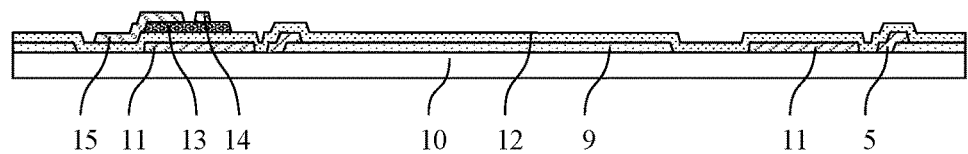
FIG. 7B is a sectional view taken along an A-A direction in FIG. 7A.
Figure 7C:
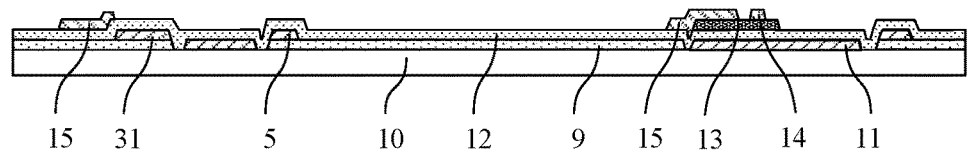
FIG. 7C is a sectional view taken along a B-B direction in FIG. 7A.

(4) A pattern of a second metal layer is formed. In an exemplary embodiment, forming of the pattern of the second metal layer may include: depositing a second metal thin film on the first base substrate on which the aforementioned pattern is formed, and patterning the second metal thin film by a patterning process, so as to form the pattern of the second metal layer disposed on the first insulating layer 12. The pattern of the second metal layer includes at least a first data line 6 and a second data line 7 extending in a vertical direction, and a source electrode 14 and a drain electrode 15 disposed in each subpixel, as shown in FIG. 7A, FIG. 7B and FIG. 7C, FIG. 7B is a sectional view taken along an A-A direction in FIG. 7A, and FIG. 7C is a sectional view taken along a B-B direction in FIG. 7A.

In an exemplary embodiment, the first data line 6 and the second data line 7 in each display column form dual data lines, the first data line 6 is disposed at a left side of each display column for providing a data signal to the subpixels of the k-th display row (odd row), and the second data line 7 is disposed at a right side of each display column for providing a data signal to the subpixels of the (k+1)-th display row (even row). In the k-th display row, the source electrode 14 of each subpixel is connected to the first data line 6 in an integrated structure, and in the (k+1)-th display row, the source electrode 14 of each subpixel is connected to the second data line 7 in an integrated structure. In each subpixel, one end of the source electrode 14 and one end of the drain electrode 15 are respectively disposed on the active layer 13, and a conductive channel is formed between the source electrode 14 and the drain electrode 15.

In an exemplary embodiment, in each display row, the source electrode 14 and the drain electrode 15 of the first subpixel and the source electrode 14 and the drain electrode 15 of the second subpixel have the same shape, size and position, and the source electrode 14 and the drain electrode 15 of the first subpixel and the source electrode 14 and the drain electrode 15 of the second subpixel have different size and position from the source electrode 14 and the drain electrode 15 of the third subpixel. The source electrode 14 and the drain electrode 15 of the first subpixel of the k-th display row and the source electrode 14 and the drain electrode 15 of the first subpixel of the (k+1)-th display row have the same shape and size, and have mirror symmetrical positions with respect to a vertical center line. The source electrode 14 and the drain electrode 15 of the second subpixel of the k-th display row and the source electrode 14 and the drain electrode 15 of the second subpixel of the (k+1)-th display row have the same shape and size, and have mirror symmetrical positions with respect to the vertical center line. The source electrode 14 and the drain electrode 15 of the third subpixel of the k-th display row and the source electrode 14 and the drain electrode 15 of the third subpixel of the (k+1)-th display row have the same shape and size, and have mirror symmetrical positions with respect to the vertical center line. The vertical center line is a center line of the first data line 6 and the second data line 7 in each display column.

In some possible implementations, a one-step patterning process may be used for forming the pattern of the semiconductor layer and forming the pattern of the second metal layer, that is, first sequentially depositing the first insulating thin film, the semiconductor layer thin film and the second metal thin film, coating a layer of photoresist on the second metal thin film, exposing and developing the photoresist by using a halftone or gray mask plate, and then forming patterns of the active layer, the first data line, the second data line, the source electrode and the drain electrode through two-step etching processes and one-step ashing process, the semiconductor layer thin film remains under the patterns of the first data line, the second data line, the source electrode and the drain electrode.

Figure 8A:
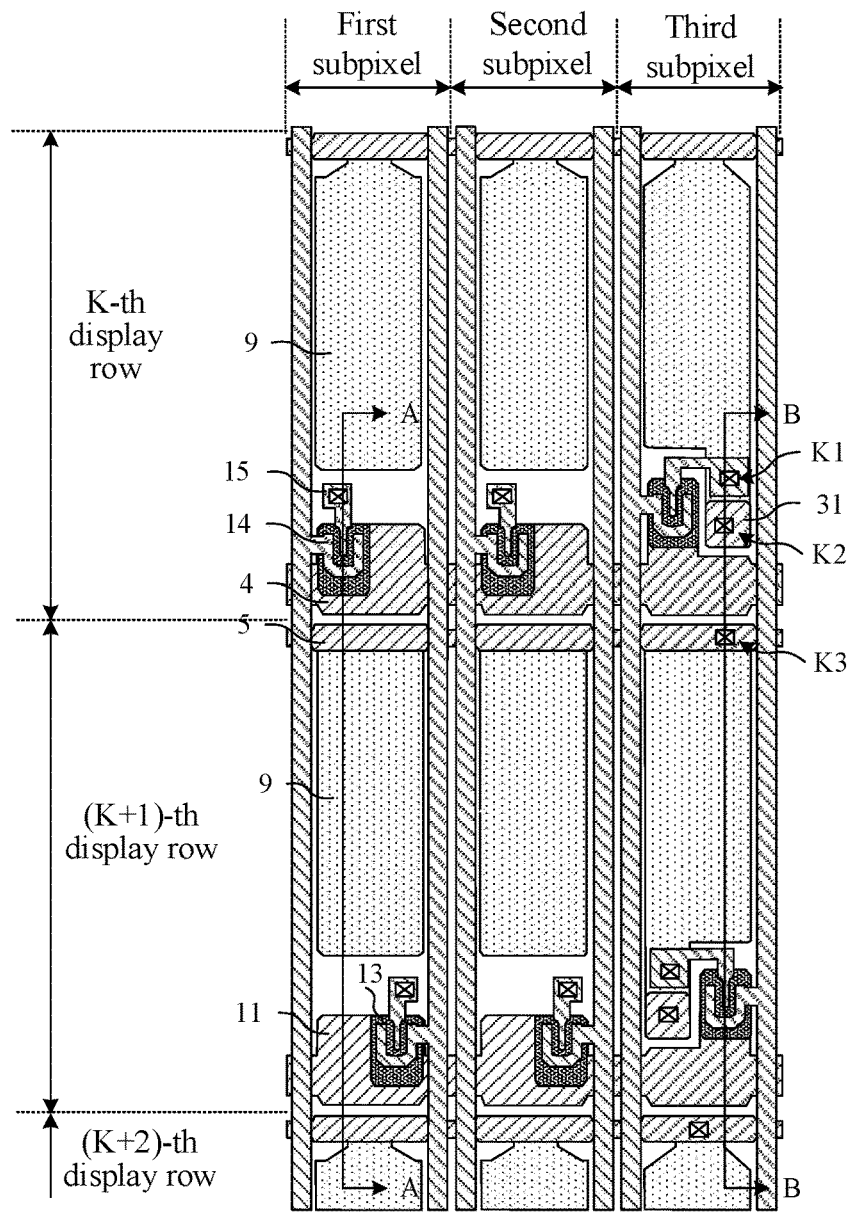
FIG. 8A is a schematic view after formation of a pattern of a second insulating layer according to an exemplary embodiment of the present disclosure.
Figure 8B:
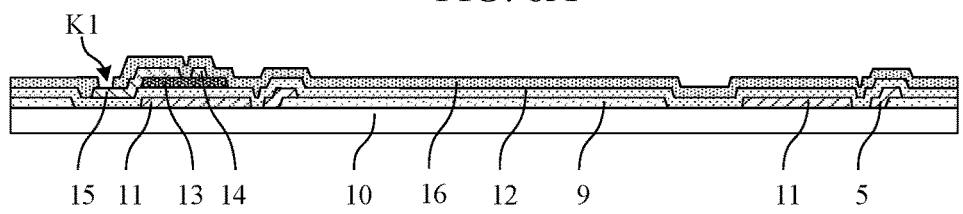
FIG. 8B is a sectional view taken along an A-A direction in FIG. 8A.
Figure 8C:
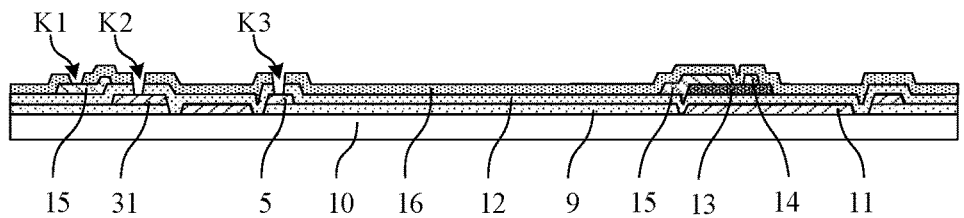
FIG. 8C is a sectional view taken along a B-B direction in FIG. 8A.

(5) A pattern of a second insulating layer is formed. In an exemplary embodiment, forming of the pattern of the second insulating layer may include: depositing a second insulating thin film on the first base substrate on which the aforementioned pattern is formed, and patterning the second insulating thin film by a patterning process, so as to form the pattern of the second insulating layer 16 covering the pattern of the second metal layer. The pattern of the second insulating layer 16 at least includes multiple vias, as shown in FIG. 8A, FIG. 8B and FIG. 8C, FIG. 8B is a sectional view taken along an A-A direction in FIG. 8A, and FIG. 8C is a sectional view taken along a B-B direction in FIG. 8A.

In an exemplary embodiment, the vias may include a first via K1 disposed at a position of each subpixel where the drain electrode 15 is located, a second via K2 disposed at a position of the third subpixel where the first connection electrode 31 is located and a third via K3 disposed at a position of the third subpixel where the common electrode line 5 is located. The second insulating layer 16 in the first via K1 is etched away to expose a surface of the drain electrode 15. The second insulating layer 16 and the first insulating layer 12 in the second via K2 are etched away to expose a surface of the first connection electrode 31, and the second insulating layer 16 and the first insulating layer 12 in the third via K3 are etched away to expose a surface of the common electrode line 5. The position of the third via K3 in the third subpixel of the k-th display row is different from that of the third via K3 in the third subpixel of the (k+1)-th display row.

Figure 9A:
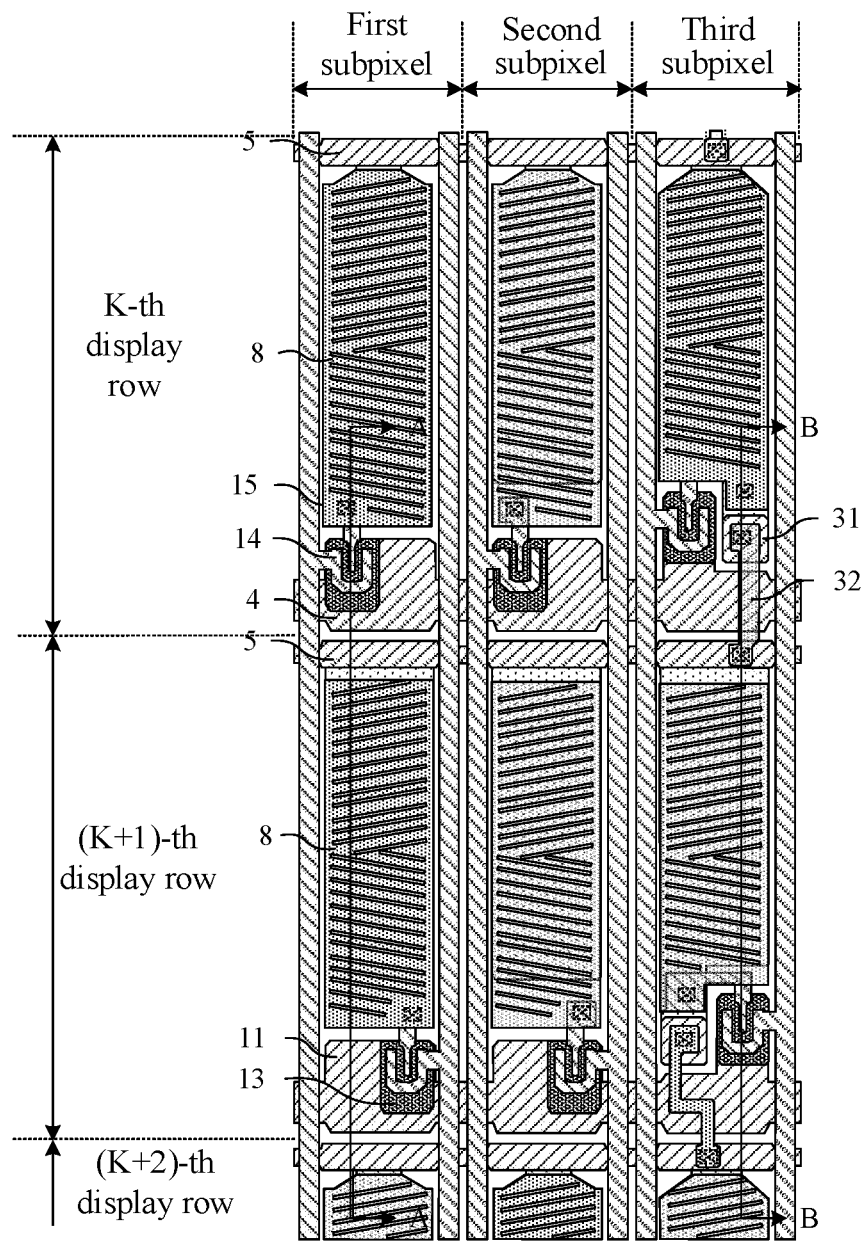
FIG. 9A is a schematic diagram after formation of a pattern of a second conductive layer according to an exemplary embodiment of the present disclosure.
Figure 9B:
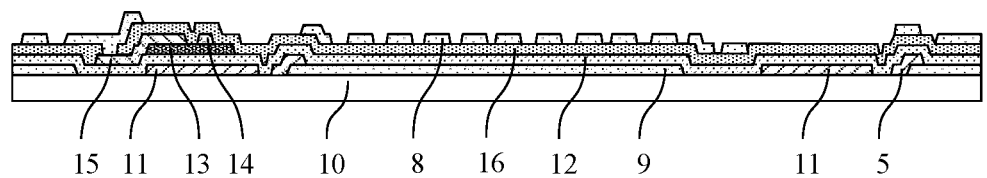
FIG. 9B is a sectional view taken along an A-A direction in FIG. 9A.
Figure 9C:
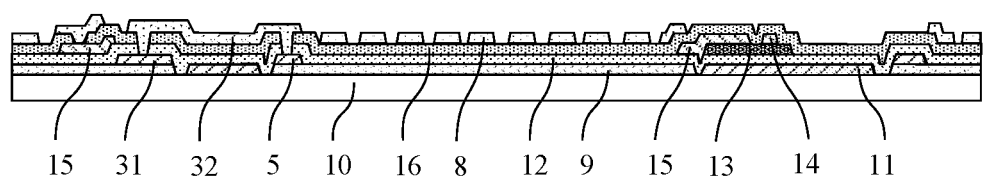
FIG. 9C is a sectional view taken along a B-B direction in FIG. 9A.

(6) A pattern of a second conductive layer is formed. In an exemplary embodiment, forming of the pattern of the second conductive layer may include: depositing a second transparent conductive thin film on the first base substrate on which the aforementioned pattern is formed, and patterning the second transparent conductive thin film by a patterning process, so as to form the pattern of the second conductive layer. The pattern of the second conductive layer at least includes a pixel electrode 8 disposed in each subpixel and a second connection electrode 32 disposed in the third subpixel, as shown in FIG. 9A, FIG. 9B and FIG. 9C, FIG. 9B is a sectional view taken along an A-A direction in FIG. 9A, and FIG. 9C is a sectional view taken along a B-B direction in FIG. 9A. In an exemplary embodiment, in each subpixel, the pixel electrode 8 is a slit electrode, which is connected to the drain electrode 15 of the subpixel where the pixel electrode 8 is located through the first via K1. In the third subpixel, one end of the second connection electrode 32 is connected to the first connection electrode 31 through the second via K2, and the other end is connected to the common electrode line 5 of the next display row through the third via K3, thereby achieving the mutual connection of the common electrodes 9 in each third subpixel in the direction of the display columns. In an exemplary embodiment, in each display row, the pixel electrodes 8 of the first subpixel and the second subpixel have the same shape and size, and the pixel electrode 8 of the third subpixel has different shape and size from the pixel electrodes 8 of the first subpixel and the second subpixel. The pixel electrode 8 of the first subpixel of the k-th display row has different shape and size from the pixel electrode 8 of the first subpixel of the (k+1)-th display row, the pixel electrode 8 of the second subpixel of the k-th display row has different shape and size from the pixel electrode 8 of the second subpixel of the (k+1)-th display row, and the pixel electrode 8 of the third subpixel of the k-th display row have different shape and size from the pixel electrode 8 of the third subpixel of the (k+1)-th display row. In an exemplary embodiment, since the common electrodes 9 of the third subpixels in the direction of the display columns are connected to each other through the second common electrode protrusion, the first connection electrode 31, the second connection electrode 32 and the common electrode line 5, and the common electrodes 9 of the subpixels in the direction of the display rows are connected to each other through the common electrode line 5, the common electrodes 9 of all subpixels are connected to each other, so that the common electrodes 9 of all subpixels have the same potential, thereby improving the display effect of the display panel.

In an exemplary embodiment, the first base substrate may adopt a glass base substrate, a quartz base substrate, or a plastic base substrate. The first metal thin film and the second metal thin film may be made of a metal material and deposited by a magnetron sputtering method (Sputter). The metal material may include any one or more of silver (Ag), copper (Cu), aluminum (Al), titanium (Ti), and molybdenum (Mo), or an alloy material of the above metals, such as aluminum neodymium alloy (AlNd) or molybdenum niobium alloy (MoNb), and may be a single-layer structure or multi-layer composite structure, such as Ti/Al/Ti. The first insulating thin film and the second insulating thin film may be made of any one or more of silicon oxide (SiOx), silicon nitride (SiNx) and silicon oxynitride (SiON), and may be a single-layer structure or a multi-layer composite structure, which is deposited by chemical vapor deposition (CVD) method or plasma-enhanced chemical vapor deposition (PECVD) method. The first insulating layer is referred to as a gate insulating (GI) layer, and the second insulating layer is referred to as a passivation (PVX) layer. The first transparent conducting thin film and the second transparent conducting thin film may be made of indium tin oxide (ITO) or indium zinc oxide (IZO). The semiconductor layer thin film may be made of materials such as amorphous indium gallium zinc oxide (a-IGZO), zinc oxynitride (ZnON), indium zinc tin oxide (IZTO), amorphous silicon (a-Si), polysilicon (p-Si), hexathiophene, or polythiophene. That is, the embodiment of the present disclosure is applicable to transistors that are prepared based on oxide technology, silicon technology or organic technology.

In this way, preparation of an array substrate is completed. The gate electrode 11, the active layer 13, the source electrode 14 and the drain electrode 15 in each subpixel constitute a thin film transistor. The common electrode 9 in each subpixel is a plate electrode, the pixel voltage 8 is a slit electrode, the common electrode 9 is configured to provide a common voltage, the pixel electrode 8 is configured to provide a pixel voltage for display, and a multi-dimensional electric field generated between the slit electrode and the plate electrode drives the liquid crystal to deflect. In the display row, the common electrodes 9 in the first subpixel, the second subpixel and the third subpixel are connected to each other by the same common electrode line 5, and in the display column, the common electrodes 9 in the k-th display row and the (k+1)-th display row are connected to each other by the first connection electrode 31 and the second connection electrode 32.

In some possible implementations, the pattern of the first conductive layer may include a pixel electrode, and the pattern of the second conductive layer may include a common electrode. The pixel electrode is a plate electrode and the common electrode is slit electrode. In some possible implementations, the method for preparing the array substrate may further include forming a planarization layer and an alignment film and performing rubbing treatment on the alignment film.

II. Preparation of a Color Film Substrate in Part I

FIG. 10A to FIG. 11C illustrate the preparation process of the color film substrate, which has a structure of six light filter units in two display rows and three display columns. In an exemplary embodiment, the k-th display row may be an odd row and the (k+1)-th display row may be an even row. Each display row includes a first light filter unit, a second light filter unit and a third light filter unit, which respectively correspond to the first subpixel, the second subpixel and the third subpixel of the array substrate. In an exemplary embodiment, the first light filter unit may be a red light filter unit, the second light filter unit may be a green light filter unit, and the third light filter unit may be a blue light filter unit.

Figure 10A:
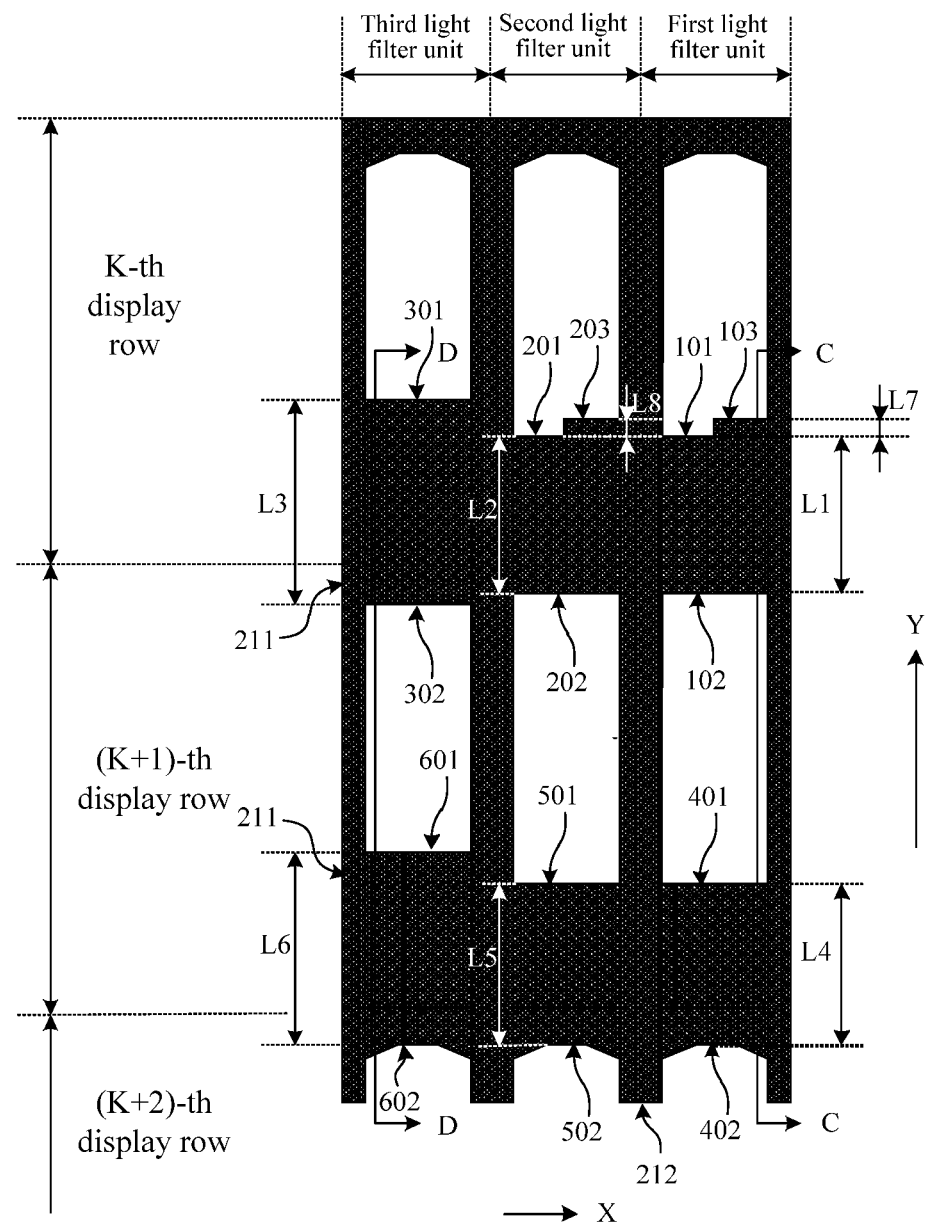
FIG. 10A is a schematic diagram after formation of a pattern of a black matrix according to an exemplary embodiment of the present disclosure.
Figure 10B:
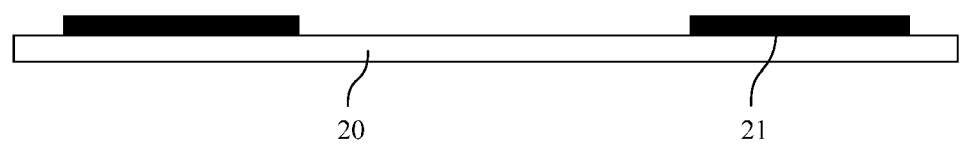
FIG. 10B is a sectional view taken along a C-C direction in FIG. 10A.
Figure 10C:
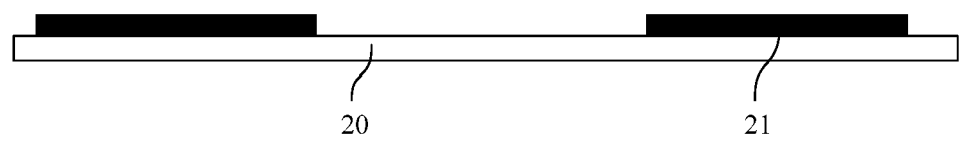
FIG. 10C is a sectional view taken along a D-D direction in FIG. 10A.

(1) A pattern of a black matrix is formed. In an exemplary embodiment, forming of the pattern of the black matrix may include: coating a black matrix thin film on a second base substrate 20, exposing the black matrix thin film with a mask, and forming the pattern of the black matrix 21 on the second base substrate 20 after development, as shown in FIG. 10A, FIG. 10B and FIG. 10C, FIG. 10B is a sectional view taken along a C-C direction in FIG. 10A, and FIG. 10C is a sectional view taken along a D-D direction in FIG. 10A.

In an exemplary embodiment, the pattern of the black matrix 21 on the color film substrate includes a shielding row 211 extending in an extending direction X of the gate line and a shielding column 212 extending in an extending direction Y of the data line. Multiple shielding rows 211 and shielding columns 212 intersect to form multiple opening regions corresponding to the positions of multiple pixel electrodes 8 on the array substrate. The position of the shielding row 211 corresponds to the positions of the gate line 4, the common voltage line 5 and the thin film transistor on the array substrate. The shielding row 211 is configured to shield the gate line, the common electrode line and the thin film transistor on the array substrate. The position of the shielding column 212 corresponds to the positions of the first data line and the second data line on the array substrate. The shielding column 212 is configured to shield the first data line and the second data line on the array substrate.

In an exemplary embodiment, in the vertical direction Y, the shielding row 211 located between the light filter unit of the k-th display row and the light filter unit of the (k+1)-th display row has a first width, the shielding row 211 located between the light filter unit of the (k+1)-th display row and the light filter unit of the (k+2)-th display row has a second width, and the first width is not equal to the second width. In an embodiment of the present disclosure, the vertical direction Y is a direction parallel to the data line.

In an exemplary embodiment, the shielding row 211 located between the light filter unit of the k-th display row and the light filter unit of the (k+1)-th display row includes an upper edge located in the k-th display row and a lower edge located in the (k+1)-th display row. The upper edge located in the k-th display row includes a first upper edge 101 located in the first light filter unit of the k-th display row, a second upper edge 201 located in the second light filter unit of the k-th display row and a third upper edge 301 located in the third light filter unit of the k-th display row.

In an exemplary embodiment, the lower edge located in the (k+1)-th display row includes a first lower edge 102 located in the first light filter unit of the (k+1)-th display row, a second lower edge 202 in located the second light filter unit of the (k+1)-th display row and a third lower edge 302 located in the third light filter unit of the (k+1)-th display row. The distance between the first upper edge 101 and the first lower edge 102 is the first distance L1, the distance between the second upper edge 201 and the second lower edge 202 is the second distance L2, and the distance between the third upper edge 301 and the third lower edge 302 is the third distance L3.

In an exemplary embodiment, the shielding row 211 located between the light filter unit of the (k+1)-th display row and the light filter unit of the (k+2)-th display row includes an upper edge located in the (k+1)-th display row and a lower edge located in the (k+2)-th display row. The upper edge located in the (k+1)-th display row includes a fourth upper edge 401 located in the first light filter unit of the (k+1)-th display row, a fifth upper edge 501 located in the second light filter unit of the (k+1)-th display row and a sixth upper edge 601 located in the third light filter unit of the (k+1)-th display row. The lower edge located in the (k+2)-th display row includes a fourth lower edge 402 located in the first light filter unit of the (k+2)-th display row, a fifth lower edge 502 located in the second light filter unit of the (k+2)-th display row and a sixth lower edge 602 located in the third light filter unit of the (k+2)-th display row. The distance between the fourth upper edge 401 and the fourth lower edge 402 is the fourth distance L4, the distance between the fifth upper edge 501 and the fifth lower edge 502 is the fifth distance L5, and the distance between the sixth upper edge 601 and the sixth lower edge 602 is the sixth distance L6.

In an exemplary embodiment, the first width being not equal to the second width includes any one or more of the following: the first distance L1 is smaller than the fourth distance L4, the second distance L2 is smaller than the fifth distance L5, and the third distance L3 is greater than the sixth distance L6.

In an exemplary embodiment, the difference between the first distance L1 and the fourth distance L4 is about 10 μm to 20 μm, the difference between the second distance L2 and the fifth distance L5 is about 10 μm to 20 μm, and the difference between the third distance L3 and the sixth distance L6 is about 1 μm to 5 μm. In some possible implementations, the difference between the first distance L1 and the fourth distance L4 is about 13 μm to 15 μm, the difference between the second distance L2 and the fifth distance L5 is about 13 μm to 15 μm, and the difference between the third distance L3 and the sixth distance L6 is about 2.5 μm to 3.5 μm.

In an exemplary embodiment, the third distance L3 is greater than the first distance L1, the third distance L3 is greater than the second distance L2, and the first distance L1 is equal to the second distance L2.

In some possible implementations, the difference between the third distance L3 and the first distance L1 is about 10 μm to 35 μm, and the difference between the third distance L3 and the second distance L2 is about 10 μm to 35 μm.

In an exemplary embodiment, the sixth distance L6 is greater than the fourth distance L4, the sixth distance L6 is greater than the fifth distance L5, and the fourth distance L4 is equal to the fifth distance L5.

In some possible implementations, the difference between the sixth distance L6 and the fourth distance L4 is about 10 μm to 20 μm, and the difference between the sixth distance L6 and the fifth distance L5 is about 10 μm to 20 μm.

In an exemplary embodiment, the shielding row located in the first light filter unit of the k-th display row is provided with a first protrusion 103, and the shielding row located in the second light filter unit of the k-th display row is provided with a second protrusion 203. The first protrusion 103 is disposed on the first upper edge 101 and extends in a direction away from the first lower edge 102, and the second protrusion 203 is disposed on the second upper edge 201 and extends in a direction away from the second lower edge 202.

In an exemplary embodiment, in the horizontal direction X, the position of the first protrusion 103 corresponds to the position of the thin film transistor on the array substrate. In an embodiment of the present disclosure, the horizontal direction X is the direction parallel to the gate lines.

In an exemplary embodiment, in a plane parallel to the color film substrate, shapes of the first protrusion 103 and the second protrusion 203 may include rectangle or trapezoid.

In an exemplary embodiment, the first protrusion 103 includes a first protrusion upper edge and the second protrusion 203 includes a second protrusion upper edge. In the vertical direction Y, the distance L7 between the first protrusion upper edge and the first upper edge 101 is about 10 μm to 20 μm, and the distance L8 between the second protrusion upper edge and the second upper edge 201 is about 10 μm to 20 μm. In the horizontal direction X, the width of the first protrusion 103 and the second protrusion 203 is ⅓ to ½ of the width of the light filter unit where the first protrusion 103 and the second protrusion 203 are located.

In an exemplary embodiment, the shielding row located between the first light filter unit of the k-th display row and the first light filter unit of the (k+1)-th display row includes a first upper edge 101 provided with a first protrusion 103 and a straight first lower edge 102, which extend along the horizontal direction X. The shielding row located between the first light filter unit of the (k+1)-th display row and the first light filter unit of the (k+2)-th display row includes a straight fourth upper edge 401 and a fourth lower edge 402 provided with two bumps, and the two bumps are respectively disposed at the positions of the fourth lower edge 402 adjacent to the shielding columns at both sides. In an exemplary embodiment, the bump may be a right triangle, the first right-angled edges of the two right triangles are respectively disposed on the fourth lower edge 402, and the second right-angled edges of the two right triangles are respectively disposed on the shielding columns at both sides of the fourth lower edge 402.

In an exemplary embodiment, the shielding row located between the second light filter unit of the k-th display row and the second light filter unit of the (k+1)-th display row includes a second upper edge 201 provided with a second protrusion 203 and a straight second lower edge 202, which extend along the horizontal direction X. The shielding row located between the second light filter unit of the (k+1)-th display row and the second light filter unit of the (k+2)-th display row includes a straight fifth upper edge 501 and a fifth lower edge 502 provided with two bumps, and the two bumps are respectively disposed at the positions of the fifth lower edge 502 adjacent to the shielding columns at both sides. In an exemplary embodiment, the bump may be a right triangle, the first right-angled edges of the two right triangles are respectively disposed on the fifth lower edge 502, and the second right-angled edges of the two right triangles are respectively disposed on the shielding columns at both sides of the fifth lower edge 502.

In an exemplary embodiment, the shielding row located between the third light filter unit of the k-th display row and the third light filter unit of the (k+1)-th display row includes a straight third upper edge 301 and a straight third lower edge 302, which extend along the horizontal direction X. The shielding row located between the third light filter unit of the (k+1)-th display row and the third light filter unit of the (k+2)-th display row includes a straight sixth upper edge 601 and a sixth lower edge 602 provided with two bumps, and the two bumps are disposed at the positions of the sixth lower edge 602 adjacent to the shielding columns at both sides. In an exemplary embodiment, the bump may be a right triangle, the first right-angled edges of the two right triangles are respectively disposed on the sixth lower edge 602, and the second right-angled edges of the two right triangles are respectively disposed on the shielding columns at both sides of the sixth lower edge 602. Taking the bump at the fourth lower edge as an example, when the bump includes a right triangle, the first right-angled edge of the right triangle is disposed at a position close to the fourth lower edge, and the second right-angled edge of the right triangle is disposed at a position of the shielding column close to a side (left or right side) of the fourth lower edge. When the bump includes two right triangles, the first right-angled edge of the first right triangle is disposed at a position close to the fourth lower edge, the second right-angled edge of the first right triangle is disposed at a position of the shielding column close to the left (or right) side of the fourth lower edge, the first right-angled edge of the second right triangle is disposed at a position close to the fourth lower edge, and the second right-angled edge of the second right triangle is disposed at a position of the shielding column close to the right (or left) side of the fourth lower edge.

In an exemplary embodiment, in the vertical direction Y, the distance between the third upper edge 301 and the first upper edge 101 is greater than the distance L7 between the first protrusion upper edge and the first upper edge 101, and the distance between the third upper edge 301 and the second upper edge 201 is greater than the distance L8 between the second protrusion upper edge and the second upper edge 201.

In an exemplary embodiment, for the shielding row between the k-th display row and the (k+1)-th display row, the distance between the upper edge of the first protrusion 103 and a first center line is greater than the distance between the first upper edge 101 and the first center line, the distance between the upper edge of the second protrusion 203 and the first center line is greater than the distance between the second upper edge 201 and the first center line, the distance between the third upper edge 301 and the first center line is greater than the distance between the upper edge of the first protrusion 103 and the first center line, and the distance between the third upper edge 301 and the first center line is greater than the distance between the upper edge of the second protrusion 203 and the first center line. The distance between the third lower edge 302 and the first center line is greater than the distance between the first lower edge 102 and the first center line, and the distance between the third lower edge 302 and the first center line is greater than the distance between the second lower edge 202 and the first center line. In an embodiment of the present disclosure, the first center line is a center line located between the upper edge in the k-th display row and the lower edge in the (k+1)-th display row and extending in the horizontal direction X.

In some possible implementations, the distance between the upper edge of the first protrusion 103 and the first center line is equal to the distance between the upper edge of the second protrusion 203 and the first center line, the distance between the first upper edge 101 and the first center line is equal to the distance between the second upper edge 201 and the first center line, and the distance between the first lower edge 102 and the first center line is equal to the distance between the second lower edge 202 and the first center line.

In an exemplary embodiment, for the shielding row between the (k+1)-th display row and the (k+2)-th display row, the distance between the sixth upper edge 601 and a second center line is greater than the distance between the fourth upper edge 401 and the second center line, the distance between the sixth upper edge 601 and the second center line is greater than the distance between the fifth upper edge 501 and the second center line, the distance between the sixth lower edge 602 and the second center line is equal to the distance between the fourth lower edge 402 and the second center line, and the distance between the sixth lower edge 602 and the second center line is equal to the distance between the fifth lower edge 502 and the second center line. In an embodiment of the present disclosure, the second center line is a center line located between the upper edge in the (k+1)-th display row and the lower edge in the (k+2)-th display row and extending in the horizontal direction X.

In some possible implementations, the distance between the fourth upper edge 401 and the second center line is equal to the distance between the fifth upper edge 501 and the second center line.

Figure 11A:
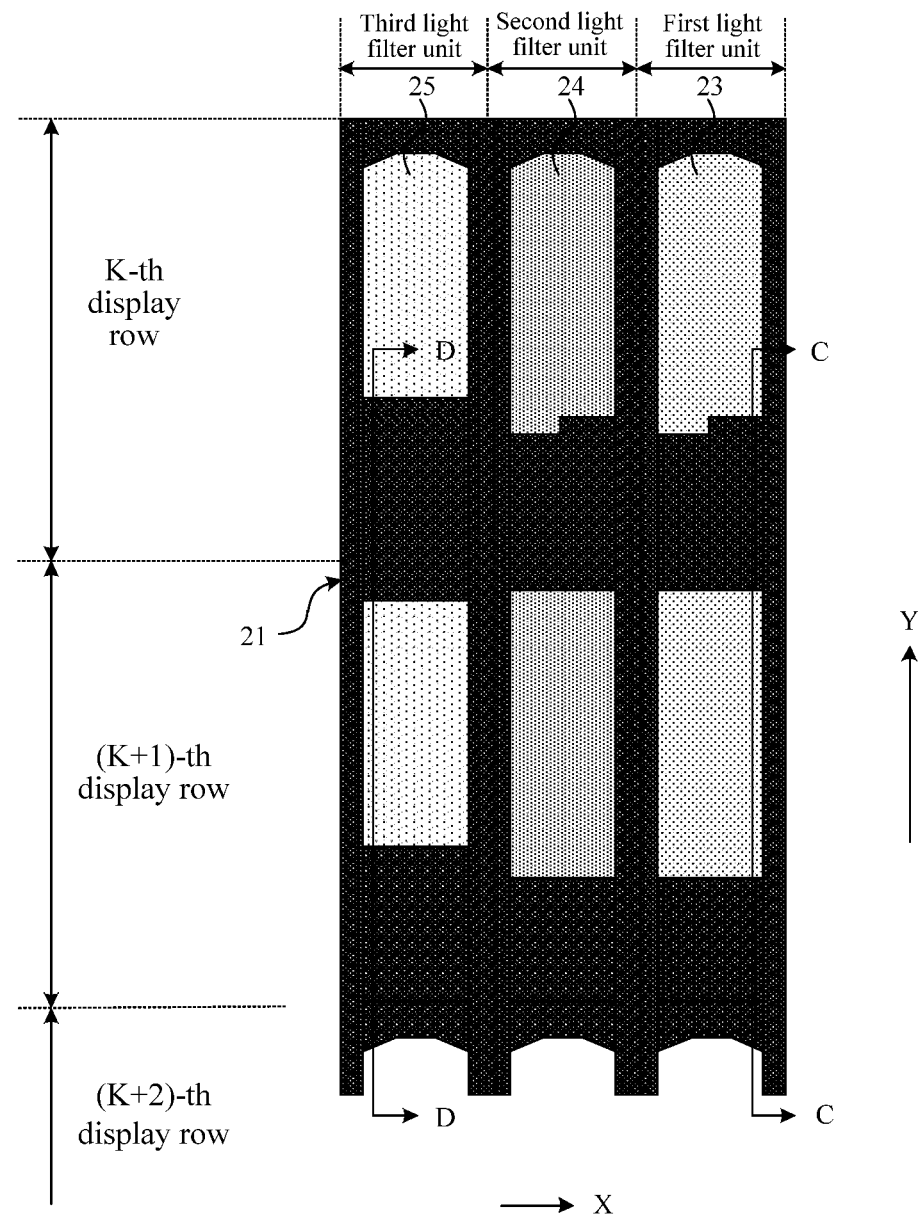
FIG. 11A is a schematic diagram after formation of a pattern of a light filter unit according to an exemplary embodiment of the present disclosure.
Figure 11B:
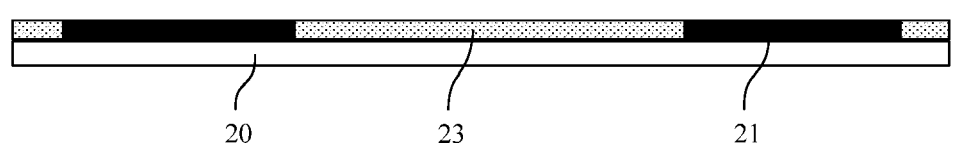
FIG. 11B is a sectional view taken along a C-C direction in FIG. 11A.
Figure 11C:
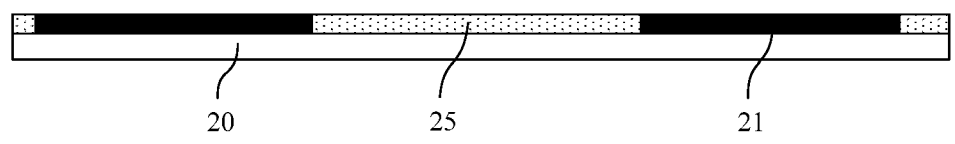
FIG. 11C is a sectional view taken along a D-D direction in FIG. 11A.

(2) A pattern of light filter units is formed. In an exemplary embodiment, forming of the pattern of the light filter units may include: sequentially forming patterns of three light filter units on the second base substrate 20 on which the pattern of the black matrix 21 is formed, including a red light filter unit 23, a green light filter unit 24 and a blue light filter unit 25, which are respectively disposed between the black matrices 21 and arranged periodically according to a set rule, as shown in FIG. 11A, FIG. 11B and FIG. 11C, FIG. 11B is a sectional view taken along a C-C direction in FIG. 11A, and FIG. 11C is a sectional view taken along a D-D direction in FIG. 11A.

III. Part II

Figure 12:
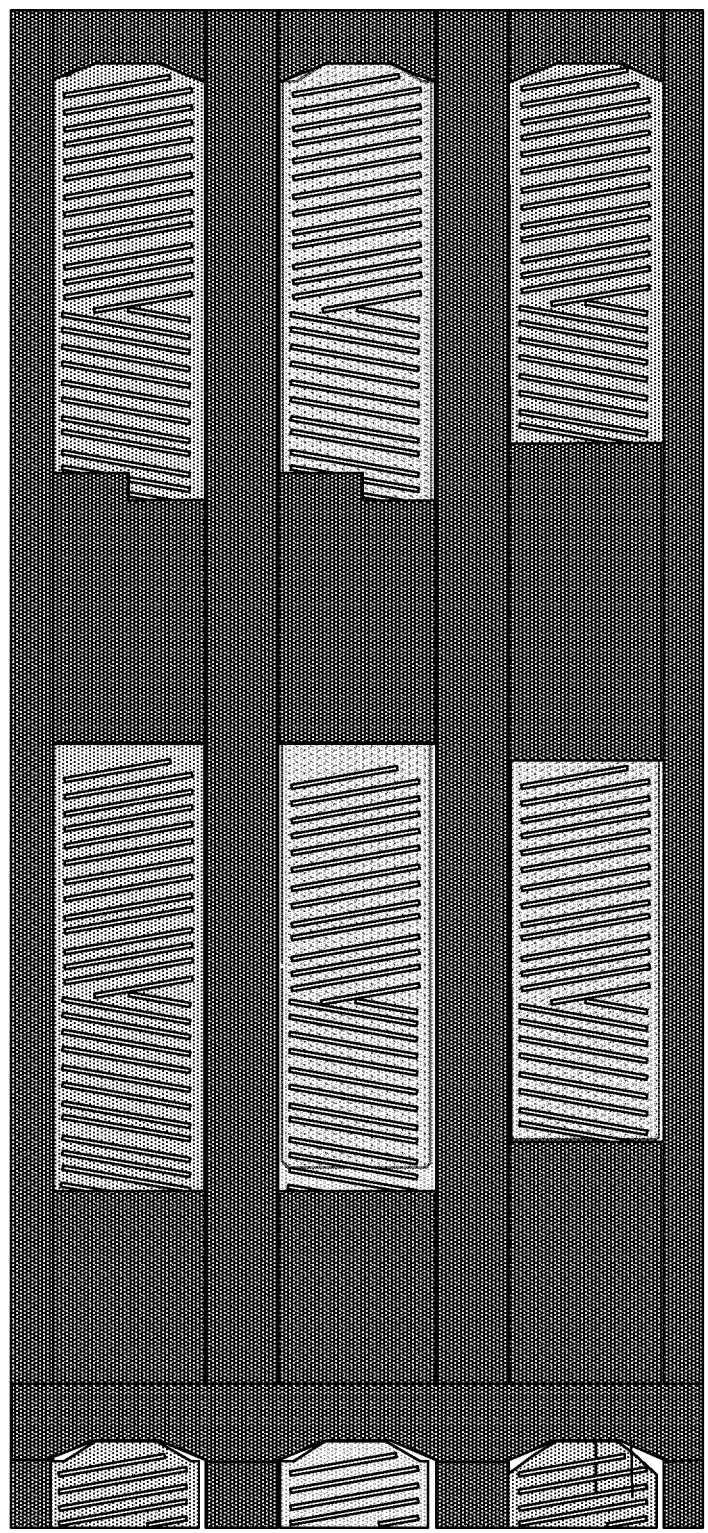
FIG. 12 is a schematic diagram of forming a display panel according to an exemplary embodiment of the present disclosure.

In an exemplary embodiment, a cell aligning process may include: firstly turning over the color film substrate so that the color film layer on the color film substrate faces the array substrate; and then coating a sealing body on a non-display region of the array substrate, dripping liquid crystal on ae display region of the array substrate, aligning and pressing the color film substrate and the array substrate relatively close to each other under vacuum condition, and curing the frame sealant by ultraviolet curing and/or heat curing, thus completing the cell aligning process to form the display panel, as shown in FIG. 12.

In an exemplary embodiment, the shielding row of the black matrix shields multiple gate lines, multiple common electrode lines and multiple thin film transistors on the first substrate, the shielding column of the black matrix shields multiple first data lines and multiple second data lines on the first substrate, and multiple opening regions formed by intersecting multiple shielding rows and shielding columns expose multiple pixel electrodes on the first substrate.

In an exemplary embodiment, in each subpixel on the first substrate, the connection region between the pixel electrode and the drain electrode overlaps with the black matrix, so that the black matrix shields the first via, thereby ensuring good display quality.

In an exemplary embodiment, in each subpixel on the first substrate, the edge region of the pixel electrode overlaps with the black matrix, so that the black matrix shields the edge region, thereby ensuring good display quality.

In some possible implementations, the array substrate may be turned over, the frame sealant may be coated on the array substrate or the color film substrate, and the liquid crystal may be dripped on the array substrate or the color film substrate, which is not limited in the present disclosure.

In some possible implementations, the array substrate and the color film substrate may also be prepared in other ways, and other film layers may be formed on the array substrate and the color film substrate, which is not limited in the present disclosure.

In an exemplary embodiment, since the thin film transistors of the subpixels in odd rows are connected to the first data line and the thin film transistors of the subpixels in even rows are connected to the second data line, the electrode shapes of the subpixels in odd rows are different from the electrode shapes of the subpixels in even rows, resulting in differences in pixel aperture ratios. In an embodiment of the present disclosure, when the black matrix is formed, the shielding row of the odd display row is disposed to have different width from the shielding row of the even display row, so that the first subpixels in the odd row and the even row have the same pixel aperture ratios, the second subpixels in the odd row and the even row have the same pixel aperture ratios, and the third subpixels in the odd row and the even row have the same pixel aperture ratios, thus reducing the difference in pixel aperture ratio between the odd display row and the even display row, and effectively avoiding the poor horizontal stripes and dark light leakage. By disposing protrusions on the shielding row adjacent to the thin film transistors in the first and second subpixels of the odd display row, the shielding row adjacent to the thin film transistors is widened, which effectively avoids the poor dark light leakage caused by the displacement of the array substrate and the color film substrate, and improves the product quality.

Figure 13:
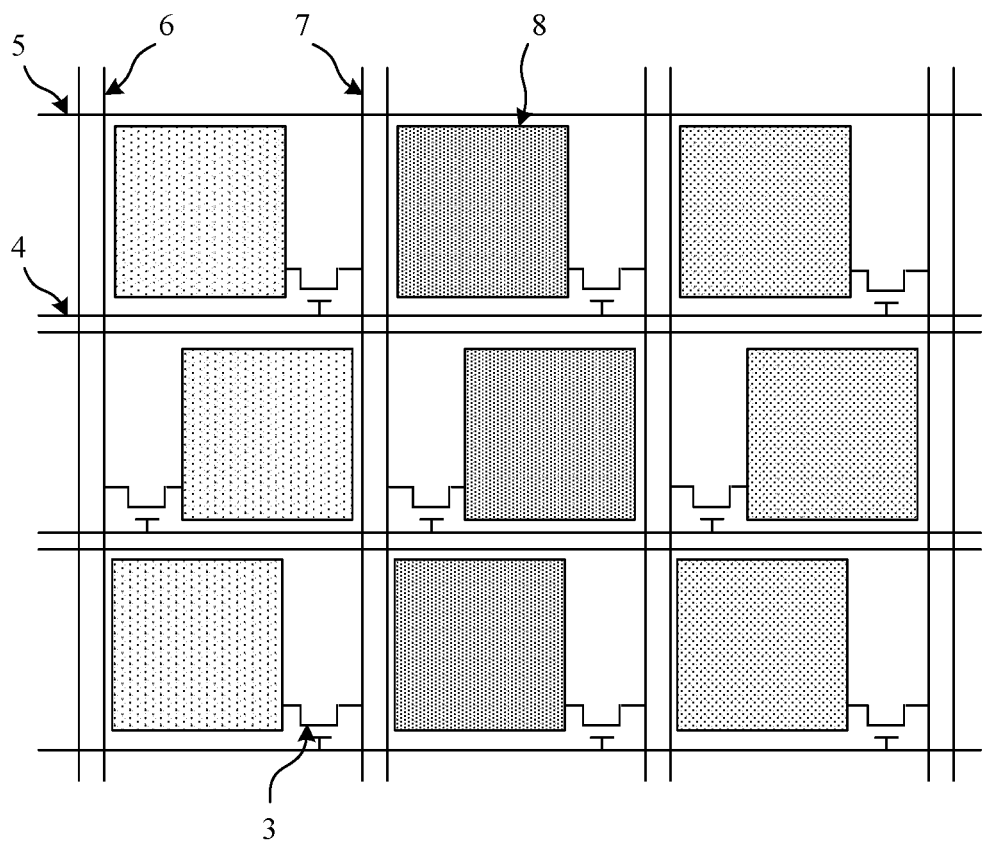
FIG. 13 is an equivalent circuit diagram of another first substrate according to an exemplary embodiment of the present disclosure.

FIG. 13 is an equivalent circuit diagram of another first substrate according to an exemplary embodiment of the present disclosure. As shown in FIG. 13, the first substrate includes M gate lines 4, M common electrode lines 5 and N pairs of data lines, and each pair of data lines include a first data line 6 and a second data line 7. Multiple gate lines 4 and multiple common electrode lines 5 extending in a horizontal direction and disposed in parallel define M display rows, and multiple first data lines 6 and multiple second data lines 7 extending in a vertical direction and disposed in parallel define N display columns. Therefore, M gate lines 4, M common electrode lines 5, N first data lines 6 and N second data lines 7 intersect vertically to define M*N subpixels arranged in an array, and M and N are positive integers greater than or equal to 1. Each subpixel includes a thin film transistor 3 and a pixel electrode 8. The source electrode of the thin film transistor 3 is connected to the first data line 6 or the second data line 7, and the drain electrode of the thin film transistor 3 is connected to the pixel electrode 8 of the subpixel where the thin film transistor 3 is located. In a display row, the gate line 4 is disposed at a side adjacent to a next display row, and the common electrode line 5 is disposed at a side adjacent to a previous display row, that is, the gate line 4 is disposed at a lower side of the subpixel of this display row, and the common electrode line 5 is disposed at an upper side of the subpixel of this display row. In a display column, the first data line 6 is disposed at a side adjacent to a previous display column, and the second data line 7 is disposed at a side adjacent to a next display column, that is, the first data line 6 is disposed at a left side of the subpixel of this display column, and located between this display column and the left display column, and the second data line 7 is disposed at a right side of the subpixel of this display column, and located between this display column and the right display column. M display rows include M/2 odd display rows and M/2 even display rows. Thin film transistors 3 of subpixels in M/2 odd display rows are connected to the second data line 7, and thin film transistors 3 of subpixels in M/2 even display rows are connected to the first data line 6.

In an exemplary embodiment, the second substrate 2 includes M*N light filter units arranged in an array, the M*N light filter units 22 are in one-to-one correspondence with the positions of the M*N subpixels, and a black matrix 21 is disposed between two adjacent light filter units 22. Since the thin film transistors of subpixels in even display rows are connected to the first data line and the thin film transistors of subpixels in odd display rows are connected to the second data line, it is possible to set the shielding row between the k-th (even) display row and the (k+1)-th (odd) display row to have a first width, and the shielding row between the (k+1)-th (odd) display row and the (k+2)-th (even) display row to have a second width, the first width is not equal to the second width.

The first width being not equal to the second width includes any one or more of the following: the first distance is smaller than the fourth distance, the second distance is smaller than the fifth distance, and the third distance is greater than the sixth distance.

The first distance is the distance between the first upper edge located in the first subpixel of the k-th display row and the first lower edge located in the first subpixel of the (k+1)-th display row, the second distance is the distance between the second upper edge located in the second subpixel of the k-th display row and the second lower edge located in the second subpixel of the (k+1)-th display row, the third distance is the distance between the third upper edge located in the third subpixel of the k-th display row and the third lower edge located in the third subpixel of the (k+1)-th display row, the fourth distance is the distance between the fourth upper edge located in the first subpixel of the (k+1)-th display row and the fourth lower edge located in the first subpixel of the (k+2)-th display row, the fifth distance is the distance between the fifth upper edge located in the second subpixel of the (k+1)-th display row and the fifth lower edge located in the second subpixel of the (k+2)-th display row, and the sixth distance is the distance between the sixth upper edge located in the third subpixel of the (k+1)-th display row and the sixth lower edge located in the third subpixel of the (k+2)-th display row.

An embodiment of the present disclosure further provides a display device, including the aforementioned display panel. The display device may be any product or component with a display function such as a mobile phone, a tablet computer, a television, a display, a laptop computer, a digital photo frame, a navigator, etc.

Although the embodiments disclosed in the present disclosure are as above, the described contents are only embodiments adopted for convenience of understanding the present disclosure and are not intended to limit the present disclosure. Any person skill in the art to which the present disclosure pertains may make any modification and change in forms and details of implementation without departing from the spirit and scope disclosed in the present disclosure. However, the scope of patent protection of the present disclosure is still subject to the scope defined in the appended claims.

The invention claimed is:

1. A display panel, comprising a first substrate and a second substrate disposed opposite to each other; wherein the first substrate comprises M*N subpixels defined by M gate lines and N pairs of data lines which intersect with each other, each pair of data lines comprises a first data line and a second data line, and each of the subpixels comprises a thin film transistor and a pixel electrode; thin film transistors of all subpixels in a m-th display row are connected to a m-th gate line; in an n-th display column, thin film transistors of subpixels in odd display rows are connected to a first data line of an n-th pair of data lines, and thin film transistors of subpixels in even display rows are connected to a second data line of the n-th pair of data lines; or, in the n-th display column, the thin film transistors of the subpixels in the even display rows are connected to the first data line of the n-th pair of data lines, and the thin film transistors of the subpixels in the odd display rows are connected to the second data line of the n-th pair of data lines; M and N are both positive integers greater than or equal to 1, m=1, 2, . . . , M, and n=1, 2, . . . , N;

the second substrate comprises M*N light filter units corresponding to the subpixels one-to-one, and a black matrix is disposed between adjacent light filter units, wherein the black matrix comprises a shielding row between adjacent display rows and a shielding column between adjacent display columns; and in an extending direction of the data lines, a shielding row located between a k-th display row and a (k+1)-th display row has a first width, a shielding row located between the (k+1)-th display row and a (k+2)-th display row has a second width, wherein the first width is not equal to the second width;

wherein a plurality of subpixels in the m-th display row comprise a first subpixel, a second subpixel and a third subpixel which are periodically arranged; the shielding row located between the k-th display row and the (k+1)-th display row comprises an upper edge located in the k-th display row and a lower edge located in the (k+1)-th display row; the upper edge comprises a first upper edge located in a first subpixel of the k-th display row, a second upper edge located in a second subpixel of the k-th display row and a third upper edge located in a third subpixel of the k-th display row; the lower edge comprises a first lower edge located in a first subpixel of the (k+1)-th display row, a second lower edge located in a second subpixel of the (k+1)-th display row and a third lower edge located in a third subpixel of the (k+1)-th display row; a shielding row located between the (k+1)-th display row and the (k+2)-th display row comprises an upper edge located in the (k+1)-th display row and a lower edge located in the (k+2)-th display row; the upper edge comprises a fourth upper edge located in the first subpixel of the (k+1)-th display row, a fifth upper edge located in the second subpixel of the (k+1)-th display row and a sixth upper edge located in the third subpixel of the (k+1)-th display row; the lower edge comprises a fourth lower edge located in a first subpixel of the (k+2)-th display row, a fifth lower edge located in a second subpixel of the (k+2)-th display row and a sixth lower edge located in a third subpixel of the (k+2)-th display row; in the extending direction of the data lines, a distance between the first upper edge and the first lower edge is a first distance, a distance between the second upper edge and the second lower edge is a second distance, a distance between the third upper edge and the third lower edge is a third distance, a distance between the fourth upper edge and the fourth lower edge is a fourth distance, a distance between the fifth upper edge and the fifth lower edge is a fifth distance, and a distance between the sixth upper edge and the sixth lower edge is a sixth distance; the first width being not equal to the second width comprises any one or more of the following: the first distance is smaller than the fourth distance, the second distance is smaller than the fifth distance, and the third distance is greater than the sixth distance; and wherein the third distance is greater than the first distance and the third distance is greater than the second distance.

2. The display panel according to claim 1, wherein a difference between the first distance and the fourth distance is 10 μm to 20 μm, a difference between the second distance and the fifth distance is 10 μm to 20 μm, and a difference between the third distance and the sixth distance is 1 μm to 5 μm.

3. The display panel according to claim 1, wherein a difference between the third distance and the first distance is 10 μm to 35 μm, and a difference between the third distance and the second distance is 10 μm to 35 μm.

4. The display panel according to claim 1, wherein the sixth distance is greater than the fourth distance and the sixth distance is greater than the fifth distance.

5. The display panel according to claim 4, wherein a difference between the sixth distance and the fourth distance is 10 µm to 20 µm, and a difference between the sixth distance and the fifth distance is 10 µm to 20 µm.

6. The display panel according to claim 1, wherein a shielding row located in the first subpixel of the k-th display row is provided with a first protrusion, which is disposed on the first upper edge and extends in a direction away from the first lower edge; and a shielding row located in the second subpixel of the k-th display row is provided with a second protrusion, which is disposed on the second upper edge and extends in a direction away from the second lower edge.

7. The display panel according to claim 6, wherein in an extending direction of the gate lines, the first protrusion is located at a side of the first subpixel where a thin film transistor is disposed, and the second protrusion is located at a side of the second subpixel where a thin film transistor is disposed.

8. The display panel according to claim 6, wherein shapes of the first protrusion and the second protrusion comprise rectangle or trapezoid.

9. The display panel according to claim 6, wherein in the extending direction of the data lines, the first protrusion comprises a first protrusion upper edge, the second protrusion comprises a second protrusion upper edge, and a distance between the first protrusion upper edge and the first upper edge is 10 µm to 20 µm, and a distance between the second protrusion upper edge and the second upper edge is 10 µm to 20 µm; and
in the extending direction of the data lines, a distance between the third upper edge and the first upper edge is greater than a distance between the first protrusion upper edge and the first upper edge, and a distance between the third upper edge and the second upper edge is greater than a distance between the second protrusion upper edge and the second upper edge.

10. The display panel according to claim 1, wherein the first lower edge, the second lower edge and the third lower edge are all straight edges extending along the extending direction of the gate lines; the fourth upper edge, the fifth upper edge and the sixth upper edge are all straight edges extending along the extending direction of the gate lines; the fourth lower edge, the fifth lower edge and the sixth lower edge each are all provided with bumps, and the bumps are respectively disposed at positions of the fourth lower edge, the fifth lower edge and the sixth lower edge adjacent to shielding columns at both sides; and
the bumps comprise right triangles, first right-angled edges of the right triangles are respectively disposed on the fourth lower edge, the fifth lower edge and the sixth lower edge, and second right-angled edges of the right triangles are respectively disposed on the shielding columns at both sides of the fourth lower edge, the fifth lower edge and the sixth lower edge.

11. The display panel according to claim 1, wherein the first substrate comprises a first conductive layer, a first metal layer, a first insulating layer, a semiconductor layer, a second metal layer, a second insulating layer and a second conductive layer which are stacked; the first conductive layer comprises a common electrode disposed in each subpixel; the first metal layer comprises a gate line, a common electrode line, a gate electrode disposed in each subpixel and a first connection electrode disposed in the third subpixel; the gate line is connected to the gate electrode in each subpixel, the common electrode line is connected to the common electrode in each subpixel, and the first connection electrode is connected to the common electrode of the third subpixel; the semiconductor layer comprises an active layer disposed in each subpixel; the second metal layer comprises a first data line, a second data line, and a source electrode and a drain electrode which are disposed in each subpixel; in the k-th display row, the source electrode of each subpixel is connected to the first data line, and in the (k+1)-th display row, the source electrode of each subpixel is connected to the second data line, and a conductive channel is formed between the source electrode and the drain electrode; the second conductive layer comprises a pixel electrode disposed in each subpixel and a second connection electrode disposed in the third subpixel, the pixel electrode is connected to the drain electrode of the subpixel where the pixel electrode is located through a via, and the second connection electrode is connected to the first connection electrode and the common electrode line through a via respectively.

12. The display panel according to claim 11, wherein in the k-th display row, common electrodes of the first subpixel, the second subpixel and the third subpixel are each provided with a first common electrode protrusion, the first common electrode protrusion of each subpixel is located at a side of the common electrode adjacent to the (k−1)-th display row; the common electrode in the third subpixel is provided with a second common electrode protrusion, which is located at a side of the common electrode adjacent to a next display row, and the first connection electrode is disposed on the second common electrode protrusion.

13. The display panel of claim 11, wherein in a first interval region between adjacent common electrode lines, the common electrode lines have a third width, in a second interval region between adjacent first interval regions, the common electrode lines have a fourth width, wherein the third width is smaller than the fourth width; the gate line has a fifth width in the first interval region, and the gate line has a sixth width in the second interval region, wherein the fifth width is smaller than the sixth width.

14. The display panel according to claim 11, wherein gate electrodes in the first subpixel, the second subpixel and the third subpixel are all rectangular, long sides of the gate electrodes in the first subpixel and the second subpixel extend along a direction of the display rows, and a long side of the gate electrode in the third subpixel extend along a direction of the display columns.

15. The display panel according to claim 11, wherein one end of the second connection electrode is connected to the first connection electrode through a via in the first insulating layer and the second insulating layer, and the other end of the second connection electrode is connected to a common electrode line of the next display row through a via in the first insulating layer and the second insulating layer.

16. The display panel according to claim 11, wherein in each subpixel, a connection region between the pixel electrode and the drain electrode overlaps with the black matrix, and an edge region of the pixel electrode overlaps with the black matrix.

17. The display panel according to claim 1, wherein a plurality of light filter units in the k-th display row comprise a first light filter unit, a second light filter unit and a third light filter unit which are periodically arranged; the first light filter unit corresponds to the first subpixel, the second light filter unit corresponds to the second subpixel and the third light filter unit corresponds to the third subpixel; the first light filter unit comprises a red light filter unit, the second light filter unit comprises a green light filter unit and the third light filter unit comprises a blue light filter unit.

18. A display device, comprising the display panel according to claim 1.

* * * * *